(12) United States Patent
Chang

(10) Patent No.: US 11,932,756 B2
(45) Date of Patent: Mar. 19, 2024

(54) MODIFIED POLYVINYL BUTYRAL MATERIAL, AND PREPARATION AND APPLICATIONS THEREOF

(71) Applicant: LEADER SHINING MATERIAL CO., LTD., Yunlin County (TW)

(72) Inventor: Chi-Lo Chang, Taichung (TW)

(73) Assignee: LEADER SHINING MATERIAL CO., LTD., Yunlin County (TW)

( * ) Notice: Subject to any disclaimer, the term of this patent is extended or adjusted under 35 U.S.C. 154(b) by 42 days.

(21) Appl. No.: 17/718,753

(22) Filed: Apr. 12, 2022

(65) Prior Publication Data
US 2023/0323106 A1     Oct. 12, 2023

(51) Int. Cl.
C08L 59/00          (2006.01)

(52) U.S. Cl.
CPC ................................. C08L 59/00 (2013.01)

(58) Field of Classification Search
CPC .. C08L 29/14; C08L 83/04; C08J 3/18; C08K 3/34; C08K 3/26; B32B 27/20; B32B 27/22
See application file for complete search history.

(56) References Cited

U.S. PATENT DOCUMENTS

2010/0137555 A1 *  6/2010  Itoh ................... C08G 75/06
                                                              528/375
2022/0081547 A1 *  3/2022  Chang ................ C08L 29/14

FOREIGN PATENT DOCUMENTS

| CN | 107286483 A | 10/2017 | |
| CN | 109563306 A | 4/2019 | |
| CN | 113861531 A * | 12/2021 | ............... C08L 7/00 |
| EP | 3459982 A1 | 3/2019 | |
| WO | WO2007146201 * | 12/2007 | ............ B01D 39/00 |
| WO | 2009/010423 A1 | 1/2009 | |

OTHER PUBLICATIONS

CN113861531 English Translation (Year: 2021).*

* cited by examiner

*Primary Examiner* — Catherine S Branch
*Assistant Examiner* — Huihong Qiao
(74) *Attorney, Agent, or Firm* — WPAT, PC

(57) ABSTRACT

The present invention relates to a modified polyvinyl butyral (PVB) material, comprising a PVB composite material, a first filler, an anti-hydrolysis agent, zinc stearate, calcium stearate, a polymeric dispersant, a deodorant, tetramethylthiuram monosulfide, and trimethylolpropane tris(3-mercaptopropionate); wherein the PVB composite material is obtained by plasticizing a composition comprising PVB and a first plasticizer. The present invention also relates to a preparation method of the modified PVB material, and a modified PVB product comprising a modified PVB layer prepared from a material comprising the modified PVB material.

25 Claims, 14 Drawing Sheets

MODIFIED POLYVINYL BUTYRAL MATERIAL, AND PREPARATION AND APPLICATIONS THEREOF

BACKGROUND OF THE INVENTION

1. Field of the Invention

The present invention relates to a modified polyvinyl butyral (PVB) material and the preparation method thereof; also relates to a modified PVB product comprising a modified polyvinyl butyral layer prepared from a material comprising the modified polyvinyl butyral material, and the preparation method of the modified PVB product.

2. Description of the Prior Arts

Polyvinyl butyral (PVB), which is a resin prepared from polyvinyl alcohol by condensation reaction with butyraldehyde, has good optical transparency and adhesive capacity, and can be adhered to surfaces made of a variety of materials. Since PVB has good optical transparency and good adhesive capacity with glass, it is often combined with glass, such as inserting a laminating film made of the PVB material between glass panes to give a variety of safety glass, windscreen glass or plate glass. Such glass having an inserted PVB layer with good optical transparency and impact resistance is broadly applied in aerospace and automotive industries. The production of the above-mentioned glass and PVB laminating films often creates PVB leftover materials. If the PVB leftover materials are thrown away directly, they not only impact the environment but also result in the waste of PVB materials. However, these PVB materials have high water absorbency and viscosity and cannot be easily subjected to other processing treatments, so they cannot be applied to other daily necessities.

PVB is also applied in the development of other laminate composite materials. Since PVB has higher water absorbency and viscosity, it is often used as an adhesive in laminate composite materials. However, its higher water absorbency may deteriorate other materials, and its higher viscosity of PVB may limit its applications. PVB materials have high water absorbency and viscosity and cannot be easily subjected to other processing treatments, so they cannot be applied to other daily necessities.

Therefore, it still needs to develop a modified PVB material having better water resistance, anti-sticking property and high temperature resistance to overcome the processing difficulties.

SUMMARY OF THE INVENTION

The PVB materials known in the art have higher water absorbency and viscosity, and cannot be easily recycled. Therefore, the present invention provides a modified PVB material, which is obtained by modifying a mixture of a PVB composite material and other materials, and the resulting modified PVB material has a better water resistance, anti-sticking property and high temperature resistance. The modified PVB layer prepared by a material comprising the modified PVB material can be used alone, or in combination with a variety of base layers to obtain varied modified PVB products. The PVB composite material, which is the main material used for modification in the present invention, can be PVB films as interlayer of wasted glass.

One purpose of the present invention is to provide a modified PVB material, comprising a PVB composite material, a first filler, an anti-hydrolysis agent, zinc stearate, calcium stearate, a polymeric dispersant, a deodorant, tetramethylthiuram monosulfide, and trimethylolpropane tris(3-mercaptopropionate); wherein the PVB composite material is obtained by plasticizing a composition comprising PVB and a first plasticizer.

According to the present invention, the above-mentioned modified PVB material exhibits a better water resistance. For example, in some embodiments, the modified PVB material absorbs water in an amount of 8 percent by weight (wt %) or less, 5 wt % or less, or 3 wt % or less after placed in water at room temperature for 24 hours.

According to the present invention, the above-mentioned modified PVB material exhibits a better anti-sticking property, especially a better anti-sticking property at high temperature. For example, in some embodiments, when two modified PVB films made from the modified PVB material are overlapped, applied with a force of 3 kilograms (kg) thereon and heated at 150° C. for 120 hours, the two films are not stuck to each other.

According to the present invention, the above-mentioned modified PVB material exhibits better high temperature resistance. For example, in some embodiments, when a modified PVB film made from the modified PVB material is heated at a temperature of from 100° C. to less than 180° C., the deformation and discoloration of the film do not occur. In some embodiments, the modified PVB film made from the modified PVB material exhibits high temperature resistance at a temperature of from 125° C. to 175° C., or from 125° C. to 170° C.

In some embodiments, the modified PVB material comprises components at the following ratio: the first filler is in an amount of 3 parts by weight to 15 parts by weight (PBW), the anti-hydrolysis agent is in an amount of 0.3 parts by weight to 2.5 parts by weight, zinc stearate is in an amount of 1.5 parts by weight to 5 parts by weight, calcium stearate is in an amount of 0.1 parts by weight to 1.5 parts by weight, the polymeric dispersant is in an amount of 0.001 parts by weight to 0.010 parts by weight, the deodorant is in an amount of 0.8 parts by weight to 2.5 parts by weight, the tetramethylthiuram monosulfide is in an amount of 0.1 parts by weight to 0.2 parts by weight, the trimethylolpropane tris(3-mercaptopropionate) is in an amount of 0.001 parts by weight to 0.005 parts by weight, based on 100 parts by weight of the total weight of the PVB composite material; and in the PVB composite material, the first plasticizer is in an amount of 3 parts by weight to 15 parts by weight based on 100 parts by weight of the total weight of the PVB composite material.

In some embodiments, the first filler comprises a crystalline aluminosilicate. In some embodiments, the crystalline aluminosilicate may be kaolin, a commercial product named "anhydrous transparent powder", or a combination thereof. The anhydrous transparent powder has a median particle diameter of 1.92 micrometers (μm) to 30.5 μm, a dibutyl phthalate (DBP) absorption number of 12 to 25, and a pH value of 7.0. In some embodiments, the first filler is in an amount of 3 parts by weight to 15 parts by weight, or 5 parts by weight to 13 parts by weight, or 7 parts by weight to 12 parts by weight, or 9 parts by weight to 11 parts by weight. In some embodiments, the amount of the first filler will influence the water absorption of the PVB composite material. When 12.5 parts by weight of a crystalline aluminosilicate is added, the water absorption of the PVB composite material is about 3%, based on 100 parts by weight of the total weight of the PVB composite material.

In some embodiments, the anti-hydrolysis agent comprises a carbodiimide type anti-hydrolysis agent. In some embodiments, the carbodiimide type anti-hydrolysis agent comprises carbodiimide, bis(2,6-diisopropylphenyl)carbodiimide, polycarbodiimides, or a combination thereof. In some embodiments, the anti-hydrolysis agent is in an amount of 0.3 parts by weight to 2.5 parts by weight, or 0.5 parts by weight to 2 parts by weight, or 1 part by weight to 1.5 parts by weight, based on 100 parts by weight of the total weight of the PVB composite material.

In some embodiments, the first plasticizer comprises a bis(2-ethylhexanoate) type plasticizer, a phthalate type plasticizer, an adipate type plasticizer, or a combination thereof. In some embodiments, the bis(2-ethylhexanoate) type plasticizer comprises triethylene glycol bis(2-ethylhexanoate). In some embodiments, the phthalate type plasticizer comprises di(2-propylheptyl) phthalate (DPHP). In some embodiments, the adipate type plasticizer comprises GLOBINEX W-2370®. In some embodiments, the first plasticizer is in an amount of 3 parts by weight to 15 parts by weight, or 5 parts by weight to 12 parts by weight, or 7 parts by weight to 10 parts by weight, based on 100 parts by weight of the total weight of the PVB composite material. In some embodiments, the modified PVB material further comprises a second plasticizer. The second plasticizer may be selected from the same group of that of the first plasticizer, and the second plasticizer and the first plasticizer may be the same or different. In some embodiments, the second plasticizer is in an amount of 2.5 parts by weight to 20 parts by weight, or 3 parts by weight to 18 parts by weight, or 5 parts by weight to 15 parts by weight, or 7 parts by weight to 10 parts by weight, based on 100 parts by weight of the total weight of the PVB composite material. The addition of the second plasticizer makes the modified PVB material softer.

In some embodiments, zinc stearate and calcium stearate are used as a lubricant. In some embodiments, zinc stearate is in an amount of 1.5 parts by weight to 5 parts by weight, or 2 parts by weight to 4 parts by weight, or 2.5 parts by weight to 3.6 parts by weight, or 2.8 parts by weight to 3.2 parts by weight, based on 100 parts by weight of the total weight of the PVB composite material. In some embodiments, calcium stearate is in an amount of 0.1 parts by weight to 1.5 parts by weight, or 0.2 parts by weight to 1.2 parts by weight, or 0.4 parts by weight to 1 part by weight, or 0.5 parts by weight to 0.7 parts by weight, based on 100 parts by weight of the total weight of the PVB composite material. In some embodiments, the lubricants, zinc stearate and calcium stearate, are used at the above-mentioned amounts as a combination to give a lower viscosity which results in a better operability, in which the materials would not stick onto the machines during the preparation process.

In some embodiments, the polymeric dispersant comprises a polysiloxane, a high melting-point wax, or a combination thereof. In some embodiments, the polysiloxane comprises a silicone oil, a hydrogen silicone oil, methylhydrogensiloxane, or a combination thereof. In some embodiments, the silicone oil comprises polydimethylsiloxane. In some embodiments, the high melting-point wax comprises a stearamide, such as stearamide, ethylene bis(stearamide), or a combination thereof. In some embodiments, the polymeric dispersant is in an amount of 0.001 parts by weight to 0.010 parts by weight, or 0.002 parts by weight to 0.007 parts by weight, or 0.003 parts by weight to 0.005 parts by weight, based on 100 parts by weight of the total weight of the PVB composite material. The addition of the polymeric dispersant makes the modified PVB material more wear resistant.

In some embodiments, the deodorant comprises sodium bicarbonate, porous inorganic silicate, or a combination thereof. In some embodiments, the deodorant is in an amount of 0.8 parts by weight to 3.0 parts by weight, or 2.3 parts by weight to 2.5 parts by weight, based on 100 parts by weight of the total weight of the PVB composite material. In some embodiments, the deodorant is a combination of sodium bicarbonate and porous inorganic silicate at a weight ratio of 2:1 to 1.8:1, or at 15:8. In some embodiments, the porous inorganic silicate is porous sodium silicate. The addition of the deodorant can eliminate irritating odor, and bring a dry and clean feeling touch.

In some embodiments, the tetramethylthiuram monosulfide (TMTM) is in an amount of 0.1 parts by weight to 0.2 parts by weight, or 0.12 parts by weight to 0.15 parts by weight, based on 100 parts by weight of the total weight of the PVB composite material. The addition of the tetramethylthiuram monosulfide makes the modified PVB material not only have better anti-sticking property and high temperature resistance, but also have good scorch resistance, so discoloration of the modified PVB material does not occur.

In some embodiments, the trimethylolpropane tris(3-mercaptopropionate) is used as a polymer modifier. In some embodiments, the trimethylolpropane tris(3-mercaptopropionate) is in an amount of 0.001 parts by weight to 0.005 parts by weight, or 0.002 parts by weight to 0.003 parts by weight, based on 100 parts by weight of the total weight of the PVB composite material. In some embodiments, the addition of the trimethylolpropane tris(3-mercaptopropionate) makes the modified PVB film made from the modified PVB material have better peel strength and make the components comprised in the composition integrate as a whole and not separated out.

In some embodiments, the modified PVB material can further comprise polyvinyl alcohol (PVA) to adjust the hardness of products. The amount of polyvinyl alcohol is not specifically limited. In some embodiments, the polyvinyl alcohol is in an amount of higher than 0 part by weight to 40 parts by weight, or 5 parts by weight to 35 parts by weight, or 10 parts by weight to 30 parts by weight, or 15 parts by weight to 20 parts by weight, based on 100 parts by weight of the total weight of the PVB composite material. In some embodiments, the polyvinyl alcohol is polyvinyl alcohol powder. The addition of polyvinyl alcohol can increase the hardness of the modified PVB material.

In some embodiments, the modified PVB material can further comprise a second filler. In some embodiments, the second filler comprises calcium carbonate. In some embodiments, the calcium carbonate is in an amount of 5 parts by weight to 160 parts by weight, or 20 parts by weight to 100 parts by weight, or 25 parts by weight to 50 parts by weight, based on 100 parts by weight of the total weight of the PVB composite material.

In some embodiments, the modified PVB material can further comprise a cold-resistant agent. In some embodiments, the cold-resistant agent comprises an adipate type cold-resistant agent, polyisobutylene, or a combination thereof. In some embodiments, the adipate type cold-resistant agent comprises dioctyl adipate, diisononyl adipate, or a combination thereof. In some embodiments, the cold-resistant agent is in an amount of 1.5 parts by weight to 10 parts by weight, or 2 parts by weight to 8 parts by weight, or 5 parts by weight to 6 parts by weight, based on 100 parts by weight of the total weight of the PVB composite material. In some embodiments, the cold-resistant agent is a combination of an adipate type cold-resistant agent and polyisobutylene at a weight ratio of 1:1. In some embodiments, the cold-resistant agent is a combination of dioctyl adipate and polyisobutylene at a weight ratio of 1:1. In some embodiments, the cold-resistant agent is a combination of diisononyl adipate and polyisobutylene at a weight ratio of 1:1.

In some embodiments, the modified PVB material can further comprise an anti-oxidant. In some embodiments, the anti-oxidant comprises a pentaerythritol ester type anti-oxidant, a phosphite type anti-oxidant, a hexamethylenediamine type anti-oxidant, or a combination thereof. In some embodiments, the pentaerythritol ester type anti-oxidant comprises pentaerythritol tetrakis(3-(3,5-di-t-butyl-4-hydroxyphenyl) propionate) (also known as the anti-oxidant 1010). In some embodiments, the phosphite type anti-oxidant comprises tris-(2,4-di-t-butylphenyl)phosphite (also known as the anti-oxidant 168). In some embodiments, the hexamethylenediamine type anti-oxidant comprises N,N'-bis(3,5-di-t-butyl-4-hydroxyphenylpropionyl)-hexamethylenediamine (also known as the anti-oxidant 1098). In some embodiments, the anti-oxidant is in an amount of 0.5 parts by weight to 2.5 parts by weight, or 1 part by weight to 2 parts by weight, or 1.5 parts by weight to 1.8 parts by weight, based on 100 parts by weight of the total weight of the PVB composite material. The addition of the anti-oxidant slows down the ageing of the modified PVB material, and extend product life.

In some embodiments, the modified PVB material can further comprise an anti-ultraviolet agent. In some embodiments, the anti-ultraviolet agent comprises a benzotriazole type anti-ultraviolet agent, a benzophenone type anti-ultraviolet agent, or a combination thereof. In some embodiments, the benzotriazole type anti-ultraviolet agent comprises octrizole (also known as the anti-ultraviolet agent 329). In some embodiments, the benzophenone type anti-ultraviolet agent comprises 2-hydroxy-4-n-octoxy-benzophenone (also known as the anti-ultraviolet agent 531). In some embodiments, the anti-ultraviolet agent is in an amount of 0.1 parts by weight to 1.5 parts by weight, or 0.3 parts by weight to 1 part by weight, or 0.5 parts by weight to 0.75 parts by weight, based on 100 parts by weight of the total weight of the PVB composite material. The addition of the anti-ultraviolet agent can enhance the weather resistance of the modified PVB material.

In some embodiments, the modified PVB material can further comprise a coloring agent. In some embodiments, the coloring agent is in an amount of 0.5 parts by weight to 35 parts by weight, or 1 part by weight to 30 parts by weight, or 5 parts by weight to 20 parts by weight, or 10 parts by weight to 16 parts by weight, based on 100 parts by weight of the total weight of the PVB composite material. In some embodiments, the coloring agent comprises an inorganic coloring material of a variety of colors, which can be formulated according to practical needs.

In some embodiments, the modified PVB material can further comprise a flame retardant. In some embodiments, the flame retardant is in an amount of 1 part by weight to 15 parts by weight, or 3 parts by weight to 8 parts by weight, based on 100 parts by weight of the total weight of the PVB composite material. In some embodiments, the flame retardant may be zinc stannate, zinc hydroxystannate, or a combination thereof. In some embodiments, the flame retardant is a combination of zinc stannate and zinc hydroxystannate at a weight ratio of 1:1. Zinc stannate and zinc hydroxystannate are used as a flame retardant and a smoke inhibitor in plastic industry, and both are non-toxic, safe and eco-friendly agents. Zinc stannate and zinc hydroxystannate are applied broadly, and their applications mainly depend on the processing temperature.

In some embodiments, the modified PVB material can further comprise glass powder. In some embodiments, the glass powder is in an amount of 3 parts by weight to 15 parts by weight, or 6 parts by weight to 12 parts by weight, or 8 parts by weight to 10 parts by weight, based on 100 parts by weight of the total weight of the PVB composite material. In some embodiments, the glass powder comprises glass powder having a low melting point. In some embodiments, the glass powder having a low melting point comprises borosilicate glass. In some embodiments, the modified PVB material further comprising the glass powder can improve the surface structure and surface energy, and form pores in micrometers or nanometers to enlarge the printed area and provide a good interface environment for inks and adhesives, thereby improving the adhesion of cured ink and color variation and improving color migration and discoloration resulted from environmental impacts; therefore, the surface of the article made of the modified PVB material is printable. In some embodiments, the article made of the modified PVB material is a modified PVB film.

In some embodiments, the modified PVB material can further comprise a foaming agent. In some embodiments, the foaming agent is in an amount of 2 parts by weight to 10 parts by weight, or 3 parts by weight to 8 parts by weight, or 5 parts by weight to 7 parts by weight, based on 100 parts by weight of the total weight of the PVB composite material. In some embodiments, the foaming agent is azodicarbonamide (also known as the AC foaming agent, which is a high temperature foaming agent). In some embodiments, the foaming agent, azodicarbonamide, can be used as a deodorant to eliminate irritating odor, and bring a dry and clean feeling touch. Azodicarbonamide forms an oily surface on the modified PVB film, which lowers the friction coefficient of the surface and brings nice feeling touch. In some embodiments, the modified PVB layer prepared by the modified PVB material comprising azodicarbonamide can be foamed at high temperature such as 190° C. to 250° C. (in which azodicarbonamide reacts completely at 250° C.) to obtain a foamed modified PVB layer.

In some embodiments, the modified PVB material can further comprise a thermoplastic polyurethane (TPU) elastomer. In some embodiments, the TPU elastomer is in an amount of 5 parts by weight to 15 parts by weight, or 8 parts by weight to 10 parts by weight, based on 100 parts by weight of the total weight of the PVB composite material. In some embodiments, the addition of an appropriate amount of the TPU elastomer not only improves the micro-mechanics (such as tearing strength, tensile strength, deformable-body mechanics) of the modified PVB material, but also improves stress relief and shrinkage resulting from linear heat release during the curing of resin, thereby improving dimensional stability.

In some embodiments, the PVB composite material is a PVB leftover material. In some embodiments, the PVB leftover material is a glass leftover material comprising a PVB laminate film, and the glass will be removed before use. In some embodiments, the PVB leftover material is a PVB laminate film leftover material. Therefore, the present invention can recycle the wasted leftover materials and responds to the environmental protection demands in the contemporary world.

In some embodiments, the modified PVB material is in a form of pellets. In some embodiments, the pellets of the modified PVB material have a diameter of 2 millimeters (mm) to 8 mm, and a length of 3 mm to 8 mm. In some embodiments, the pellets of the modified PVB material have a diameter of 5 mm, and a length of 6 mm. The size of the modified PVB pellets can be determined according to practical needs.

In some embodiments, the elements are mixed and compounded, and modified to obtain the modified PVB material. In some embodiments, the elements are mixed and compounded, and then modified for several times to obtain the modified PVB material. In some embodiments, the elements are mixed and compounded, and then modified for at least twice to obtain the modified PVB material. In some embodiments, the temperatures of each modifying step can be the same or different.

Another purpose of the present invention is to provide a preparation method of the above-mentioned modified PVB material, comprising the following steps:
(S1) mixing and compounding components including the PVB composite material, the first filler, the anti-hydrolysis agent, zinc stearate, calcium stearate, the polymeric dispersant, the deodorant, tetramethylthiuram monosulfide, and trimethylolpropane tris(3-mercaptopropionate) at 165° C. to 175° C. for 5 minutes to 10 minutes to obtain a crude modified PVB material; and
(S2) filtering the crude modified PVB material at 150° C. to 170° C. with a sieve of 140 meshes to 160 meshes to obtain the modified PVB material.

In some embodiments, the step (S1) is carried out in an internal mixer or Banbury mixer. In some embodiments, the step (S1) is carried out at 170° C.

In some embodiments, the step (S2) is repeated at least twice. In some embodiments, the step (S2) is repeated at least three times. In some embodiments, the sieve used in the step (S2) is a sieve of 150 meshes.

In some embodiments, the step (S2) is carried out in a pelletizer. In some embodiments, the step (S2) is carried out in a filter. In some embodiments, before filtering, the crude modified PVB material is rolled into a sheet and cut into soft stipes which are suitable for filtering. In some embodiments, after filtering, the modified PVB material is rolled into a sheet and cut into soft stipes which are suitable for any follow-up processing. Rolling the crude modified PVB material or the modified PVB material into a sheet and cutting the sheet into soft stipes are physical processing steps and they do not change the properties of the modified PVB material. The step (S2) is used to filter out impurities, especially impurities from the PVB leftover material. The PVB leftover material is a recycled material, so the step (S2) is necessary to remove impurities and obtain the modified PVB material of uniform quality. The arrangement of the above-mentioned machines and the number of carrying out the filtering step can be determined in accordance with the source of original materials and product needs.

In some embodiments, the preparation method further comprises the following step: (S3) cutting the modified PVB material into the modified PVB pellets by dies and cutter.

In some embodiments, the modified PVB pellets have a diameter of 2 mm to 8 mm, and a length of 3 mm to 8 mm. The size of the modified PVB pellets can be determined according to practical needs. Another purpose of the present invention is to provide a modified PVB product, comprising a modified PVB layer prepared from a material comprising the above-mentioned modified PVB material. In some embodiments, the modified PVB layer is prepared by casting the modified PVB pellets. In some embodiments, the modified PVB layer is prepared by a casting process or a calendaring process.

In some embodiments, the modified PVB product further comprises a base layer set on the modified PVB layer, and the base layer is selected from the group consisting of a fabric layer, a metalized plastic layer, a plastic layer without any metal component, and combinations thereof.

In some embodiments, the fabric layer can be a woven fabric, a knitted fabric or a non-woven fabric. In some embodiments, the fabric layer that can be a woven fabric is an Oxford fabric. In some embodiments, the fabric layer can be made by a natural material (e.g. cotton, hemp, jute, linen, wool and the like), a synthetic material (e.g. a polyester material, a polyamide material and the like), or any combinational materials blending any of the above materials. In some embodiments, the fabric made of the polyester fiber is a terylene fabric. In some embodiments, the fabric made of the polyamide fiber is a nylon fabric. In some embodiments, the woven fabric is a mesh fabric. In some embodiments, the non-woven fabric is a mesh fabric.

In some embodiments, the plastic layer can be made of a plastic commonly used in fabrics, such as polyethylene terephthalate (PET) and polyurethane (PU).

In some embodiments, the metalized plastic layer can be an aluminum metalized plastic layer, such as aluminum (Al) metalized PET film. In some embodiments, the Al metalized PET film is a PET film having one side plated with 0.02 wt % of aluminum.

In some embodiments, the modified PVB product further comprises one or more adhesive layers. In some embodiments, an adhesive layer is further comprised between each modified PVB layer and each base layer, wherein the adhesive layer is composed of an adhesive. In some embodiments, when the amount of the adhesive is 20 grams per square meter ($g/m^2$) or more (e.g. 20 $g/m^2$ to 50 $g/m^2$), the solvent comprised in the adhesive may need to be evaporated by an oven. In some embodiments, when the amount of the adhesive is less than 20 $g/m^2$ (e.g. 4 $g/m^2$ to 18 $g/m^2$, or 6 $g/m^2$ to 16 $g/m^2$, or 8 $g/m^2$ to 12 $g/m^2$, or 10 $g/m^2$ to 11 $g/m^2$), the solvent comprised in the adhesive may not need to be evaporated in advance because when the adhesive layer set on the base layer is in contact with the modified PVB material at a high temperature during or after the casting step, the solvent comprised in the adhesive layer can be removed.

In some embodiments, the adhesive layer is independently composed of a mixture of a glue and a crosslinking agent. In some embodiments, the glue comprises a polyurethane glue, an acrylic glue, or a combination thereof. In some embodiments, the crosslinking agent comprises a urethane prepolymer crosslinking agent. In some embodiments, the crosslinking agent is in an amount of 1.5 parts by weight to 9 parts by weight, or 2 parts by weight to 8 parts by weight, based on 100 parts by weight of the total weight of the glue.

In some embodiments, when the fabric layer is a non-woven fabric made of polypropylene, or a knitted fabric made of cotton, terylene, or a combinational material blending cotton and terylene, the adhesive layer may be not necessary between the fabric layer and the modified PVB layer. In some embodiments, when the fabric layer is an Oxford fabric or a terylene fabric, the adhesive layer may be necessary between the fabric layer and the modified PVB layer.

In some embodiments, the modified PVB layer is further foamed. In some embodiments, the foaming agent (azodicarbonamide) is added in the step (S1) to prepare a modified PVB material, and then the modified PVB layer prepared by the modified PVB material is foamed at high temperature to obtain a foamed modified PVB layer. In some embodiments, a material comprising a modified PVB material (not including azodicarbonamide) and azodicarbonamide is used to prepare a modified PVB layer, and then the modified PVB layer is foamed to obtain a foamed modified PVB layer. In some embodiments, the material comprising a modified PVB material (not including azodicarbonamide) and azodicarbonamide are in a form of particles.

Yet another purpose of the present invention is to provide a preparation method of the above-mentioned modified PVB product, comprising the following steps: casting the above-mentioned modified PVB material to form a first modified PVB layer. In some embodiments, the preparation method of the modified PVB product further comprises the following steps: cooling and setting, and winding the resulting product.

In some embodiments, the first modified PVB layer is casted on a first base layer. In some embodiments, before casting to form the first modified PVB layer, the method further comprises the following step: coating an adhesive on the first base layer to form a first adhesive layer, and the first adhesive layer is located between the first modified PVB layer and the first base layer. In some embodiments, the preparation method of the modified PVB product further comprises the following steps: cooling and setting, and winding the resulting product.

In some embodiments, the preparation method of the modified PVB product further comprises the following step: casting the modified PVB material on the other side of the first base layer to form a second modified PVB layer, so as to obtain a modified PVB product comprising the first base layer inserted between the first modified PVB layer and the second modified PVB layer. In some embodiments, before casting to form the second modified PVB layer, the method further comprises the following step: coating an adhesive on the other side of the first base layer to form a second adhesive layer, and the second adhesive layer is located between the second modified PVB layer and the first base layer. In some embodiments, the preparation method of the modified PVB product further comprises the following steps: cooling and setting, and winding the resulting product.

In some embodiments, the preparation method of the modified PVB product further comprises the following step: covering a second base layer over the first modified PVB layer, so as to obtain a modified PVB product comprising the first modified PVB layer inserted between the first base layer and the second base layer. In some embodiments, the first modified PVB layer and the second base layer are bound by hot pressing. In some embodiments, before covering the second base layer, the method further comprises the following step: coating an adhesive on the second base layer to form a third adhesive layer, and the third adhesive layer is located between the first modified PVB layer and the second base layer. In some embodiments, the preparation method of the modified PVB product further comprises the following steps: cooling and setting, and winding the resulting product.

In some embodiments, the modified PVB material can be repeatedly casted on the first modified PVB layer to form a thicker first modified PVB layer. In some embodiments, the modified PVB material can be repeatedly casted on the second modified PVB layer to form a thicker second modified PVB layer. In some embodiments, the casting step can be repeated to form a thicker modified PVB layer, and then the thicker modified PVB layer is subjected to the follow-up steps such as foaming, embossing, setting, winding or a combination thereof. In some embodiments, the thickness of the modified PVB layer formed by every casting step is 0.05 mm to 0.5 mm, and the number of casting is determined by the cast layer thickness needed for the final product.

Still yet another purpose of the present invention is to provide a preparation method of the above-mentioned modified PVB product, comprising the following steps: calendering the above-mentioned modified PVB material to form a first modified PVB layer. In some embodiments, the preparation method of the modified PVB product further comprises the following steps: cooling and setting, and winding the resulting product.

In some embodiments, the first modified PVB layer and a first base layer are bound by hot pressing to obtain a modified PVB product comprising the first modified PVB layer and the first base layer. In some embodiments, before hot pressing the first modified PVB layer and the first base layer, the method further comprises the following step: coating an adhesive on the first base layer to form a first adhesive layer, and the first adhesive layer is located between the first modified PVB layer and the first base layer. In some embodiments, the preparation method of the modified PVB product further comprises the following steps: cooling and setting, and winding the resulting product.

In some embodiments, the preparation method of the modified PVB product further comprises the following step: hot pressing a second modified PVB layer with the modified PVB product comprising the first modified PVB layer and the first base layer, so as to obtain a modified PVB product comprising the first base layer inserted between the first modified PVB layer and the second modified PVB layer. In some embodiments, before hot pressing the second modified PVB layer with the modified PVB product comprising the first modified PVB layer and the first base layer, the method further comprises the following step: coating an adhesive on the other side of the first base layer to form a second adhesive layer, and the second adhesive layer is located between the second modified PVB layer and the first base layer. In some embodiments, the preparation method of the modified PVB product further comprises the following steps: cooling and setting, and winding the resulting product.

In some embodiments, the preparation method of the modified PVB product further comprises the following step: hot pressing a second base layer with the modified PVB product comprising the first modified PVB layer and the first base layer, so as to obtain a modified PVB product comprising the first modified PVB layer inserted between the first base layer and the second base layer. In some embodiments, before hot pressing a second base layer with the modified PVB product comprising the first modified PVB layer and the first base layer, the method further comprises the following step: coating an adhesive on the first modified PVB layer to form a third adhesive layer, and the third adhesive layer is located between the first modified PVB layer and the second base layer. In some embodiments, the preparation method of the modified PVB product further comprises the following steps: cooling and setting, and winding the resulting product.

In some embodiments, the first modified PVB layer can be repeatedly hot pressed with another first modified PVB layer to form a thicker first modified PVB layer. In some embodiments, the second modified PVB layer can be repeatedly hot pressed with another second modified PVB layer to form a thicker second modified PVB layer. In some embodiments, the hot pressing step can be repeated to form a thicker modified PVB layer, and then the thicker modified PVB layer is subjected to the follow-up steps such as foaming, embossing, setting, winding or a combination thereof. In some embodiments, the thickness of the modified PVB layer formed by every calendering step is 0.05 mm to 1.2 mm, and the number of hot pressing is determined by the layer thickness needed for the final product.

In some embodiments, the preparation method of the modified PVB product further comprises the following steps: embossing and/or foaming the first modified PVB layer and/or the second modified PVB layer.

In some embodiments, the materials of the first base layer and the second base layer can be the same or different. The materials of each base layer are as described herein.

In some embodiments, the materials of the first adhesive layer, the second adhesive layer and the third adhesive layer can be the same or different. The materials of each adhesive layer are described herein.

From above, it is clear that the present invention provides a modified PVB material with good water resistance, anti-sticking property and high temperature resistance, and it produces modified PVB products comprising one or more modified PVB layers prepared from a material comprising the modified PVB material by casting or calendering. In addition, the modified PVB material can be prepared from the PVB leftover material. The leftover material to be discarded can be reused, and this responds to the demands of environmental protection in this era.

DETAILED DESCRIPTION OF THE PREFERRED EMBODIMENTS

Examples are given below to illustrate the details of the present invention. Other objectives, advantages and novel features of the invention will become more apparent from the following detailed description when taken in conjunction with the accompanying drawings.

First, component materials of all Examples and Comparative Examples listed in the following Table 1 were prepared.

TABLE 1

| Component (PBW) | Example | | | | | | | | | | Comparative Example | |
| --- | --- | --- | --- | --- | --- | --- | --- | --- | --- | --- | --- | --- |
| | 1 | 2 | 3-1 | 3-2 | 3-3 | 4-1 | 4-2 | 5-1 | 5-2 | 6 | 1 | 2 |
| PVB leftover material | 100 | 100 | 100 | 100 | 100 | 100 | 100 | 100 | 100 | 100 | 100 | 100 |
| Calcium carbonate | 0 | 0 | 0 | 0 | 0 | 25 | 50 | 25 | 25 | 0 | 0 | 0 |
| Kaolin powder | 12.5 | 12.5 | 12.5 | 12.5 | 12.5 | 12.5 | 12.5 | 12.5 | 12.5 | 12.5 | 0 | 0 |
| Carbodiimide | 2 | 2 | 2 | 2 | 2 | 2 | 2 | 2 | 2 | 2 | 0 | 0 |
| Polyisobutylene | 0 | 3 | 0 | 0 | 0 | 0 | 0 | 0 | 0 | 0 | 0 | 0 |
| Dioctyl adipate | 0 | 3 | 0 | 0 | 0 | 0 | 0 | 0 | 0 | 0 | 0 | 0 |
| Zinc stearate | 2.8 | 2.8 | 2.8 | 2.8 | 2.8 | 2.8 | 2.8 | 2.8 | 2.8 | 2.8 | 0 | 2.8 |
| Calcium stearate | 0.7 | 0.7 | 0.7 | 0.7 | 0.7 | 0.7 | 0.7 | 0.7 | 0.7 | 0.7 | 0 | 0.7 |
| Polydimethylsiloxane | 0.005 | 0.005 | 0.005 | 0.005 | 0.005 | 0.005 | 0.005 | 0.005 | 0.005 | 0.005 | 0 | 0 |
| Tetramethylthiuram monosulfide | 0.12 | 0.12 | 0.12 | 0.12 | 0.12 | 0.12 | 0.12 | 0.12 | 0.12 | 0.12 | 0 | 0 |
| Trimethylolpropane tris(3-mercaptopropionate) | 0.003 | 0.003 | 0.003 | 0.003 | 0.003 | 0.003 | 0.003 | 0.003 | 0.003 | 0.003 | 0 | 0 |
| TPU elastomer | 0 | 0 | 5 | 10 | 15 | 0 | 0 | 0 | 0 | 0 | 0 | 0 |
| Porous inorganic silicate | 0.8 | 0.8 | 0.8 | 0.8 | 0.8 | 0.8 | 0.8 | 0.8 | 0.8 | 0.8 | 0 | 0 |
| Sodium bicarbonate | 1.5 | 1.5 | 1.5 | 1.5 | 1.5 | 1.5 | 1.5 | 1.5 | 1.5 | 1.5 | 0 | 0 |
| Zinc stannate | 0 | 0 | 0 | 0 | 0 | 0 | 0 | 4 | 7.5 | 0 | 0 | 0 |
| Zinc hydroxystannate | 0 | 0 | 0 | 0 | 0 | 0 | 0 | 4 | 7.5 | 0 | 0 | 0 |
| Azodicarbonamide | 0 | 0 | 0 | 0 | 0 | 0 | 0 | 0 | 0 | 5 | 0 | 0 |

Preparation Method (I) of Modified PVB Material of the Present Invention

Figure 1:
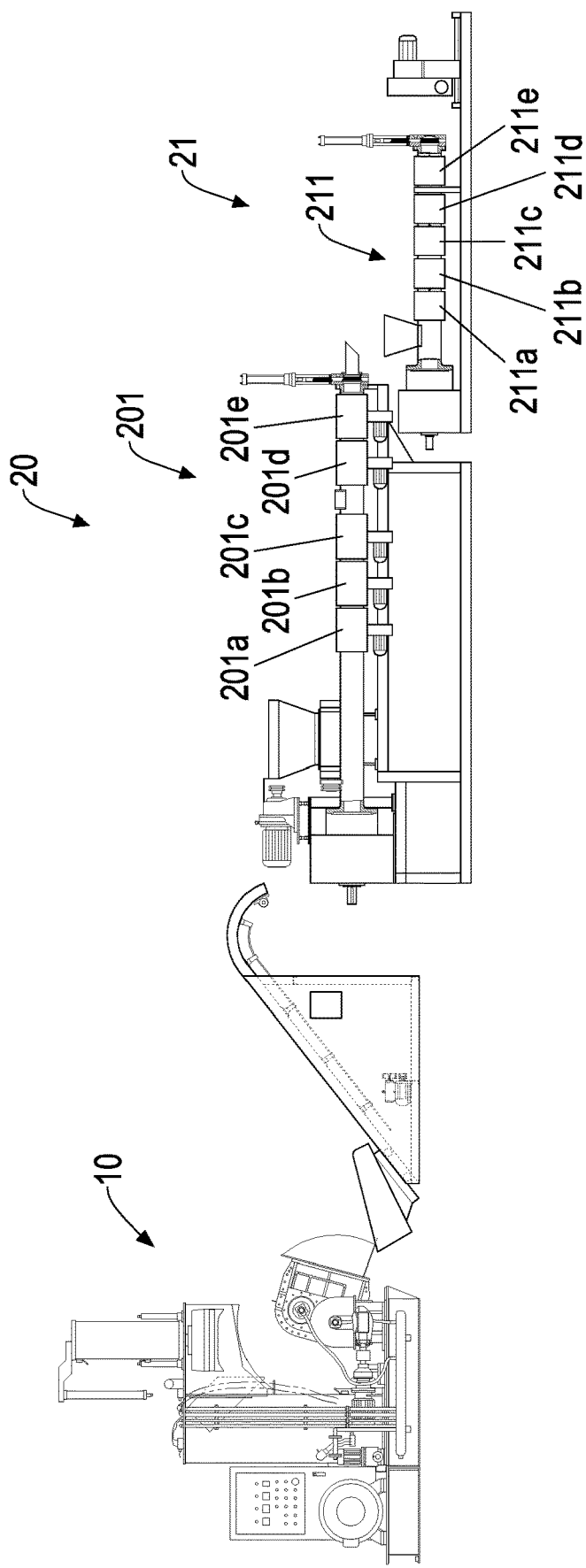
FIG. 1 is the schematic diagram of the production line of the modified PVB material of the present invention.

The production line of one embodiment of the modified PVB material of the present invention was shown in FIG. 1. First, the PVB leftover material including the PVB laminate film obtained from wasted glass (with the glass removed) and the PVB laminate film offcut (e.g., the PVB composite material comprising PVB and a first plasticizer with the first plasticizer in an amount of 3 parts by weight to 15 parts by weight based on 100 parts by weight of the total weight of the PVB composite material), and the first filler (kaolin powder), the second filler (calcium carbonate), the anti-hydrolysis agent (carbodiimide), the cold-resistant agent (polyisobutylene, dioctyl adipate), zinc stearate, calcium stearate, polymeric dispersant (polydimethylsilxane), tetramethylthiuram monosulfide, trimethylolpropane tris(3-mercaptopropionate), elastomer (TPU elastomer), deodorant (sodium bicarbonate and porous inorganic silicate), high temperature foaming agent (azodicarbonamide) were placed in the internal mixer 10, mixed and compounded at 170° C. for 8 minutes, to make a crude modified PVB material.

The crude modified PVB material was then transferred into the first pelletizer 20. When the crude modified PVB material passed through the screw of the first pelletizer 20, it was maintained at a temperature of 150° C. to 170° C. And it was extruded under a pressure when it passed through the zone 201a to the zone 201e of the screw 201 (for about 1 minute to 3 minutes, during which the temperatures of the zones were the same) and filtered with a sieve of 150 meshes to obtain a primarily-filtered modified PVB material.

The primarily-filtered modified PVB material was then transferred into the second pelletizer 21. When the primarily-filtered modified PVB material passed through the screw 211 of the second pelletizer 21, it was heated at a temperature of 150° C. to 170° C. And it was extruded under a pressure when it passed through the zone 211a to the zone 211e of the screw 211 (for about 1 to 3 minutes, during which the temperatures of the zones were the same) and filtered again with a sieve of 150 meshes (filtered twice) to obtain the modified PVB material. At last, the modified PVB pellets of the present invention were obtained by the dies and cutter, in which the pellets had a diameter of 5 mm and a length of 6 mm. The modified PVB pellets were uniform in size, and qualified for the following process for the products. The size of the modified PVB pellets could be adjusted according to practical needs.

Preparation Method (II) of Modified PVB Material of the Present Invention

Figure 2:
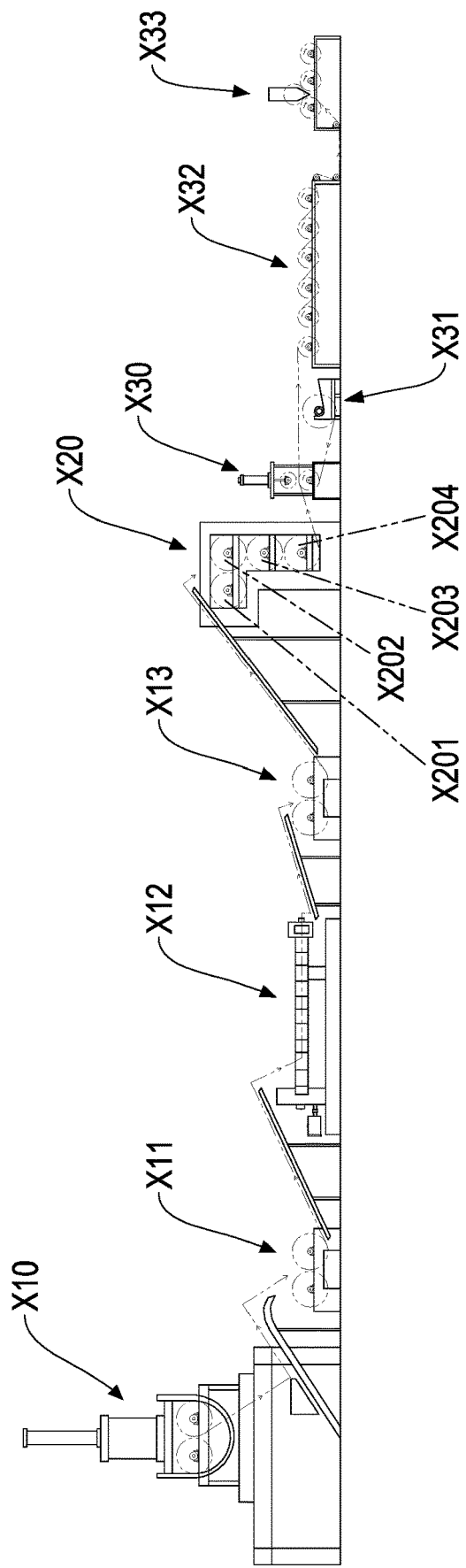
FIG. 2 is the schematic diagram of another production line of the modified PVB material of the present invention combined with the production line used in the Preparation Examples 9 to 14 of the present invention.

The production line of another embodiment of the modified PVB material of the present invention was shown in the left part of FIG. 2. First, the PVB leftover material including the PVB laminate film obtained from wasted glass (with the glass removed) and the PVB laminate film offcut (e.g., the PVB composite material comprising PVB and a first plasticizer with the first plasticizer in an amount of 3 parts by weight to 15 parts by weight based on 100 parts by weight of the total weight of the PVB composite material), and the first filler (kaolin powder), the second filler (calcium carbonate), the anti-hydrolysis agent (carbodiimide), the cold-resistant agent (polyisobutylene, dioctyl adipate), zinc stearate, calcium stearate, polymeric dispersant (polydimethylsilxane), tetramethylthiuram monosulfide, trimethylolpropane tris(3-mercaptopropionate), elastomer (TPU elastomer), deodorant (sodium bicarbonate and porous inorganic silicate), and high temperature foaming agent (azodicarbonamide) were placed in the Banbury mixer X10, mixed and compounded at 170° C. for 8 minutes, to make a crude modified PVB material.

The crude modified PVB material was then transferred into the first rolling mill X11 to be rolled into a sheet and cut into first soft stipes (of the crude modified PVB material) having a width of 10 centimeters (cm) to 20 cm and a thickness of 1 cm to 2 cm. The first soft stipes were transferred into a filter X12 having a temperature of 160° C. and filtered to obtain a primarily-filtered modified PVB material. After that, the primarily-filtered modified PVB material was then transferred into the second rolling mill X13 to be rolled into a sheet and cut into second soft stipes (of the modified PVB material) having a width of 10 cm to 20 cm and a thickness of 1 cm to 2 cm. The second soft stipes were ready for further processing such as directly calendering into a modified PVB film.

The filtering step of the crude modified PVB material was mainly used for filtering out impurities from the PVB leftover material. The PVB leftover material is a recycled material, so the filtering step was necessary to remove impurities and obtain the modified PVB material of uniform quality. The arrangement of the above-mentioned machines and the number of the filtering step to be carried out can be determined in accordance with the source of original materials and product needs.

In addition, the modified PVB pellets could be used to prepare a calendar film by directly calendering. For example, the modified PVB pellets could be placed in the Banbury mixer X10 shown in FIG. 2, heated to 160° C. and simply maintained at this temperature, then transferred into the first rolling mill X11 and the filter X12 to carry out the step (S2) again. After that, the modified PVB material was ready for direct calendering.

Water Resistance Test

The components of Example 1 and Comparative Example 1 were used to prepare the modified PVB materials in the form of pellets by the above preparation method (I), and then the modified PVB materials were casted to obtain films having a thickness of 0.2 mm, respectively, and the films were cut to give specimens 1A and 1C having a total weight of 100 grams (g). In addition, the components of Example 1 were used to prepare the modified PVB material by the above preparation method (II), and then the modified PVB material was calendered to obtain a film having a thickness of 0.2 mm, and the film was cut to give specimens 1B having a total weight of 100 g. These specimens 1A to 1C were soaked in water at room temperature (25° C.) for 24 hours. After that, the water on the surface of the specimens were wiped out, and the specimens were weighted to calculate the amount of water absorbed therein. The results are shown in Table 2.

TABLE 2

| Specimen | 1A | 1B | 1C |
| --- | --- | --- | --- |
| Material | Example 1 | Example 1 | Comparative Example 1 (PVB leftover) |
| Method for preparing film | Pellet casting | Direct calendering | Pellet casting |
| Weight of specimen after soaking in water (g) | 103 | 103 | 114 |
| Water absorbency (%) | 3% | 3% | 14% |

From Table 2, it was clear that the specimens 1A and 1B had a much lower water absorbency than the specimen 1C. In other words, specimens 1A and 1B had a better water resistance. The specimens 1C were whitened after water absorption, which was disadvantageous to the follow-up preparation of the PVB products. On the contrary, the specimens 1A and 1B were not whitened. In addition, the results of the specimens 1A and 1B showed that the modified PVB materials prepared by the above preparation methods (I) and (II) had similar properties.

High Temperature Resistance and Anti-Sticking Tests

The components of Example 1 and Comparative Example 2 were used to prepare the modified PVB material by the above preparation method (II), and then the modified PVB materials were directly calendered to obtain films having a thickness of 0.2 mm, respectively, and the films were cut to give specimens 2A and 2B having a size of 50 mm×100 mm.

For the high temperature resistance test, the specimens 2A and 2B were heated in an oven at 110° C. for 5 minutes. After the high temperature treatment, the specimen 2B was molten into a paste, but the specimen 2A was not. In addition, when the temperature of the oven was increased, especially to a temperature higher than 125° C., the specimen 2B was discolored, but the specimen 2A was not. After heating in an oven at 180° C. for 5 minutes, the specimen 2A was molten into a paste, but was still not discolored.

The anti-sticking test was also carried out by the specimens 2A and 2B. Two specimens 2A or 2B were overlapped, evenly pressed with a force of 3 kg thereon, and heated in an oven at 150° C. for 120 hours. It was found that the specimens 2A did not stick to each other after the aforesaid treatment, but the specimens 2B stuck to each other. Therefore, the modified PVB material of Example 1 had a better anti-sticking property at high temperature than the Comparative Example 2. Similarly, the components of Comparative Example 1 (PVB leftover) were used to prepare the modified PVB materials in the form of pellets by the above preparation method (I), and then the modified PVB material was casted to obtain films having a thickness of 0.2 mm, and the film was cut to give specimens 2C having the same size for the anti-sticking test. The specimens 2C were stuck to each other after being evenly pressed with a force of 3 kg thereon and heated in an oven at 50° C. for 12 hours.

Cold Resistance Test

The components of Examples 1 and 2 were used to prepare the modified PVB materials in the form of pellets by the above preparation method (I), and then the modified PVB materials were casted to obtain films having a thickness of 0.3 mm, respectively, and the films were cut to give specimens 3A and 3B having a size of 100 mm×100 mm.

The specimens 3A and 3B were placed in a freezer at 0° C. for 60 minutes. After the low temperature treatment, the specimen 3A was stiffened, but the flexibility of the specimen 3B was kept, as soft as the untreated specimen. After that, the specimens 3A and 3B were placed in a freezer at −5° C. for 60 minutes, and it was found that the specimen 3A was obviously stiffened, and the specimen 3B became slightly harder than the specimen 3B tested at 0° C. Therefore, it was clear that the addition of a mixture comprising equal amounts of dioctyl adipate and polyisobutylene could keep the flexibility of the modified PVB material at 0° C.

Tensile Recovery Test

The components of Examples 1, 3-1 to 3-3 were used to prepare the modified PVB materials in the form of pellets by the above preparation method (I), and then the modified PVB materials were casted to obtain films having a thickness of 0.2 mm, respectively, and the films were cut to give specimens 4A to 4D having a length of 7 inches and a width of 4 inches for the tensile recovery test.

The first 0.5 inch of the two ends of any of the specimens 4A to 4D were respectively connected to the two clamps of a tensile testing machine, and the clamps were pulled outward until the specimen under test reached 9-inch long, then the specimens were disconnected and laid flat. After the specimens recovered and did not shrink anymore, the length of the specimens was measured and the tensile recovery rate was calculated by the equation: (length after pulling−length before pulling)/length before pulling. The results are shown in Table 3.

TABLE 3

| Specimen | 4A | 4B | 4C | 4D |
|---|---|---|---|---|
| Material | Example 1 | Example 3-1 | Example 3-2 | Example 3-3 |
| TPU elastomer (PBW) | 0 | 5 | 10 | 15 |
| Tensile recovery rate | 1.5% | 1.2% | 0.8% | 0.2% |

From Table 3, it was clear that when the amount of the TPU elastomer was increased, the tensile recovery rate was reduced. The modified PVB film made from the modified PVB material comprising TPU elastomer in an amount of 15 parts by weight was hardly deformed. However, when the amount of TPU elastomer was beyond 15 parts by weight, the tensile recovery rate would increase. For example, when the amount of TPU elastomer was 18 parts by weight, the tensile recovery rate was 1.3%.

Tensile Strength and Tearing Strength Tests

The components of Examples 1, 4-1, 4-2 and Comparative Example 2 were used to prepare the modified PVB materials in the form of pellets by the above preparation method (I), and then the modified PVB materials were casted to obtain films having a thickness of 0.365 mm, respectively, and the films were cut to give specimens 5A to 5D having a size of 300 mm×100 mm. When the longitudinal direction of the specimens was the same with the longitudinal direction of the film, they are marked as machine direction (MD). When the longitudinal direction of the specimens was the same with the cross direction of the film, they are marked as cross direction (CD).

The first 0.5 inch of the two ends of any of the specimens 5A to 5D were respectively connected to the two clamps of a tensile testing machine, and the clamps were pulled outward with an increasing force. The test ended after the MD or CD specimen under test was broken, and the force value in kilogram-force (kgf) at breaking was recorded. Every group of specimens were tested for three times and the average is calculated. The results are shown in Table 4.

Additionally, the tear strength test was carried out in accordance with the standard test GB/T16491. The above-mentioned components were casted to obtain films having a thickness of 0.365 mm, respectively, and the films were cut to give V-shaped specimens 6A to 6D having two "wings". The V-shaped specimens 6A to 6D as a whole had a length of 120 mm, a wing width (the width of any of the wings of V) of 30 mm, and an included angle between the two wings of 135°. Two square areas having a length of 20 mm and a width of 30 mm were attached to the end of wings respectively (the square length was included within the length of specimens as a whole) in order to be connected by the clamps for testing. When the longitudinal direction of the V-shaped specimens was the same with the longitudinal direction of the film, they are marked as machine direction (MD). When the longitudinal direction of the V-shaped specimens was the same with the cross direction of the film, they are marked as cross direction (CD).

The tear strength was tested by HD-A604S Testing Machine. During the test, the temperature was 23±2° C., the relative humidity was 60±5%, and the distance between the two clamps was 80 mm. The two ends of the V-shaped specimens 6A to 6D were connected to the upper and lower clamps respectively, and the center of the specimen under test was aligned with the median line between the two clamps. After that, the clamps were pulled outward at a testing speed of 200 millimeters per minute (mm/min). The test ended after the MD or CD specimen under test was broken, and the force value in kgf at breaking was recorded. Every group of specimens were tested for three times and the average is calculated. The results are shown in Table 4.

TABLE 4

| Specimen | Material | Calcium carbonate (PBW) | Average tensile strength (kgf) | | Average tear strength (kgf) | |
|---|---|---|---|---|---|---|
| | | | MD | CD | MD | CD |
| 5A/6A | Example 1 | 0 | 32.9 | 29.2 | 6.3 | 7.2 |
| 5B/6B | Example 4-1 | 25 | 25.7 | 21.1 | 5.4 | 6.5 |
| 5C/6C | Example 4-2 | 50 | 18.3 | 13.7 | 4.1 | 5.4 |
| 5D/6D | Comparative Example 2 | 0 | 33.2 | 29.8 | 6.6 | 7.5 |

From Table 4, it was clear that the addition of the second filler calcium carbonate reduced the tensile strength and tear strength, and the properties of the modified PVB material could be regulated accordingly.

Preparation of Modified PVB Products of the Present Invention

Figure 3:
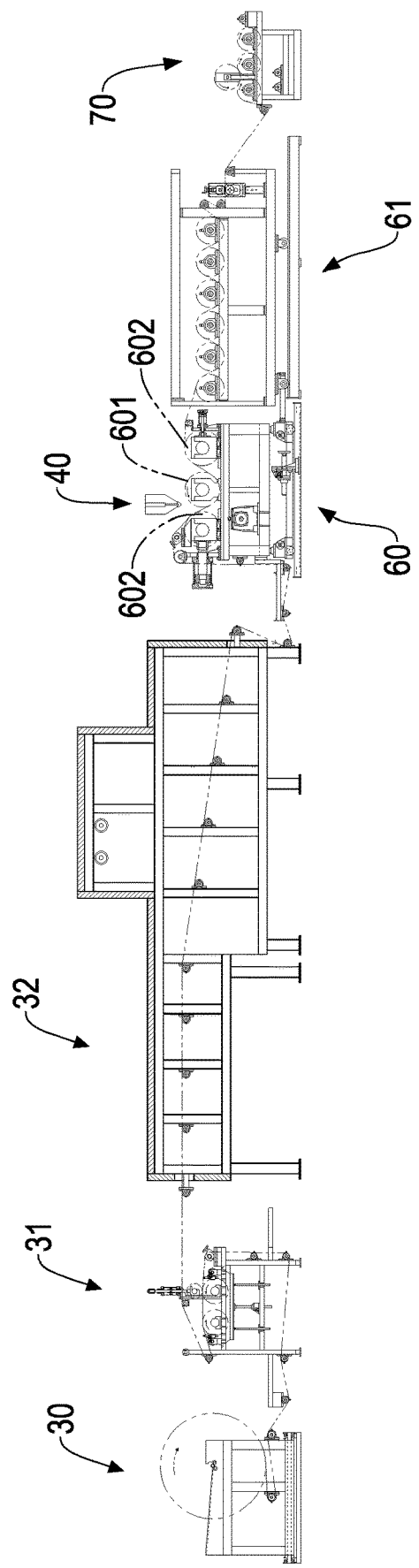
FIG. 3 is the schematic diagram of the production line used in the Preparation Examples 1, 2, 7 and 8 of the present invention.

Preparation Example 1: Single-Sided Fabric Comprising a Modified PVB Cast Layer Prepared by the Modified PVB Material of the Present Invention First, as shown in FIG. 3, a fabric (woven or non-woven) was sent by the first sending machine 30, and transferred to the first gluing machine 31. In the first gluing machine 31, an adhesive was coated on one side of the fabric, and the adhesive-coated fabric was transferred to the oven 32 and heated at a temperature of 100° C. to 130° C., to evaporate the solvent in the adhesive.

Figure 4:
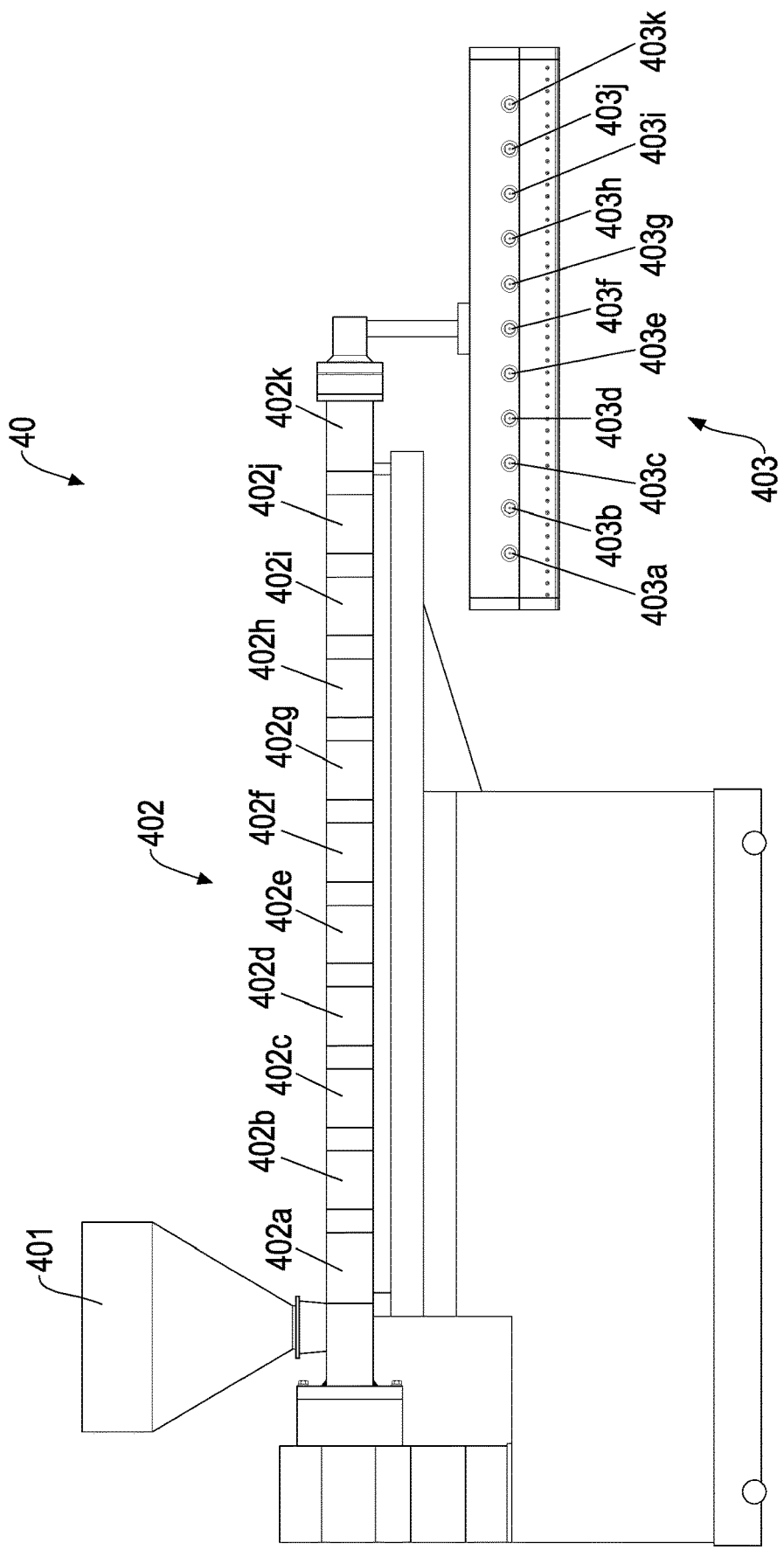
FIG. 4 is the schematic diagram of the casting machine used in Preparation Examples 1 to 8 of the present invention.

The above-mentioned modified PVB pellets were loaded into the feed hopper 401 of the casting machine 40. The directions of the casting machine 40 shown in FIG. 3 and FIG. 4 were different, and the structure of the casting machine 40 was as shown in FIG. 4. The modified PVB pellets were molten after they passed through the zones 402a to 402k of the screw 402, and the molten modified PVB material passed through the zones 403a to 403k of the die 403 was casted on the adhesive-coated side of the fabric. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

Figure 5:
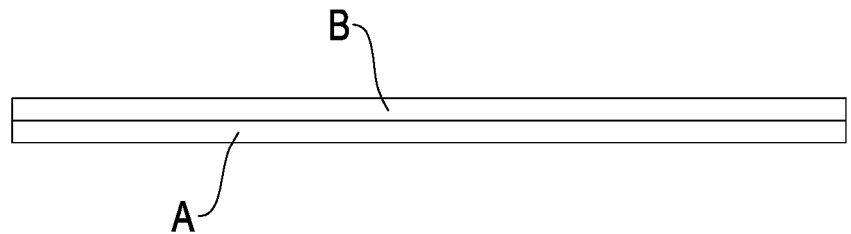
FIG. 5 is the cross-sectional view of one embodiment of the modified PVB product of the present invention.

The fabric casted with a layer of the modified PVB material was transferred to the first embossing machine 60 for embossing treatment; and then transferred to the first setting machine 61 for cooling and setting, to give a single-sided fabric comprising a modified PVB cast layer. The single-sided fabric comprising a modified PVB cast layer was wound by the first winder 70. The cross-sectional view of the single-sided fabric comprising a modified PVB cast layer was shown in FIG. 5, in which A indicated the fabric layer, and B indicated the modified PVB layer.

In addition, when a thicker modified PVB cast layer was needed to be formed on the side of the fabric, the casting step could be simply repeated on the same side.

Figure 6:
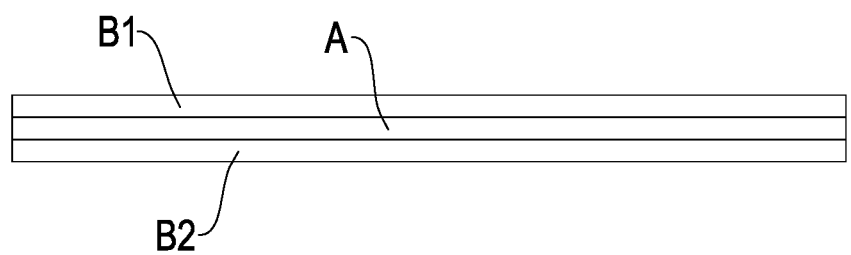
FIG. 6 is the cross-sectional view of one embodiment of the modified PVB product of the present invention.

Preparation Example 2: Double-Sided Fabric Comprising Two Modified PVB Cast Layers Prepared by the Modified PVB Material of the Present Invention In addition, the modified PVB material could be casted on the other side (not coated with the adhesive yet) of the single-sided fabric comprising a modified PVB cast layer obtained in Preparation Example 1 to form another modified PVB cast layer in accordance with the steps described in Preparation Example 1, to give a double-sided fabric comprising two modified PVB cast layers. The cross-sectional view of the double-sided fabric comprising two modified PVB cast layers was shown in FIG. 6, in which A indicated the fabric layer, B1 indicated the first modified PVB layer, and B2 indicated the second modified PVB layer.

Similarly, when a thicker modified PVB cast layer was needed to be formed on either side of the fabric, the casting step could be simply repeated on the desired side.

Figure 7:
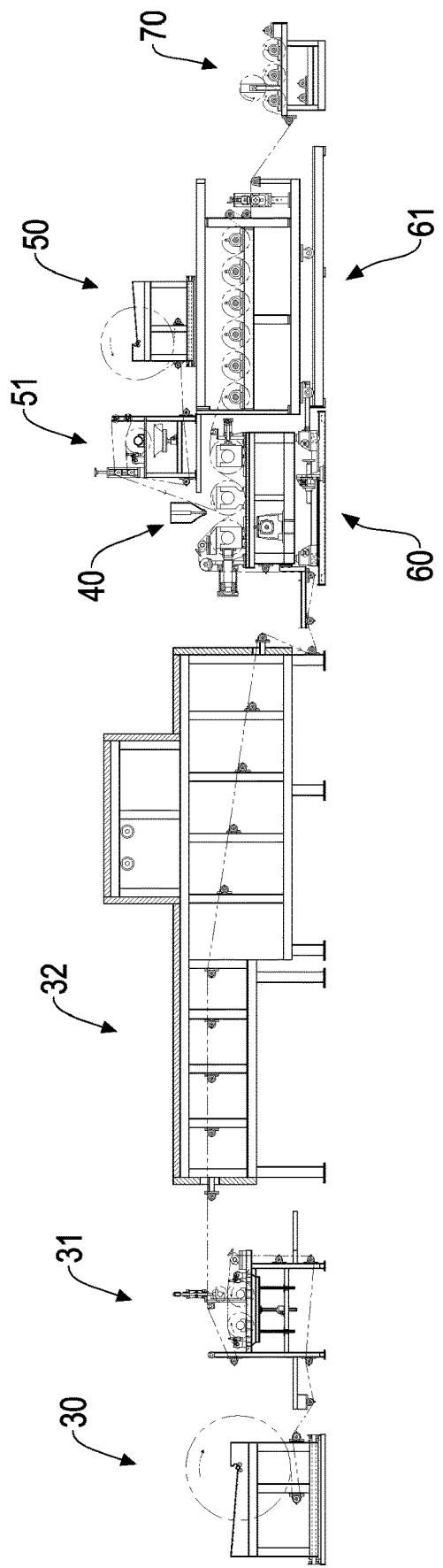
FIG. 7 is the schematic diagram of the production line used in the Preparation Examples 3, 5 and 6 of the present invention.

Preparation Example 3: Fabric Comprising an Inserted Modified PVB Cast Layer Prepared by the Modified PVB Material of the Present Invention As shown in FIG. 7, two fabrics (woven or non-woven) were sent by the first sending machine 30 and the second sending machine 50, respectively.

The first fabric sent by the first sending machine 30 was transferred to the first gluing machine 31, and an adhesive was coated on one side of the first fabric. The adhesive-coated first fabric was transferred to the oven 32 and heated at a temperature of 100° C. to 130° C., to evaporate the solvent in the adhesive.

The above-mentioned modified PVB pellets were loaded into the feed hopper 401 of the casting machine 40. The directions of the casting machine 40 shown in FIG. 4 and FIG. 7 were different, and the structure of the casting machine 40 was as shown in FIG. 4. The modified PVB pellets were molten after they passed through the zones 402a to 402k of the screw 402, and the molten modified PVB material passed through the zones 403a to 403k of the die 403 was casted on the adhesive-coated side of the first fabric. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

Figure 8:
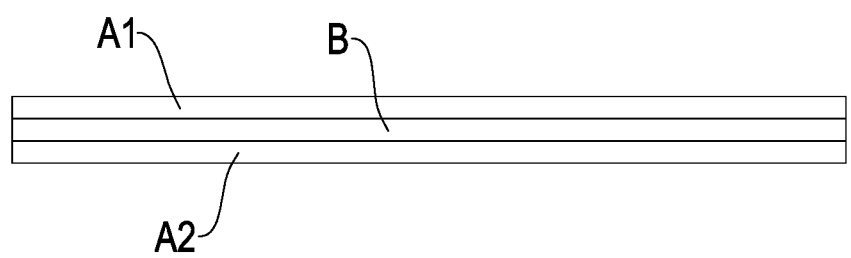
FIG. 8 is the cross-sectional view of one embodiment of the modified PVB product of the present invention.

In addition, the second fabric sent by the second sending machine 50 was transferred to the second gluing machine 51, and an adhesive was coated on one side of the second fabric, in which the amount of the adhesive was less than 20 g/m². After that, the modified PVB layer casted on the first fabric was bound to the adhesive-coated side of the second fabric, and transferred to the first embossing machine 60 and pressed for binding by a flat roll with a force of 12 kilograms (kg). After the second fabric was bound to the modified PVB cast layer on the first fabric, a product having the modified PVB cast layer inserted between the first fabric and the second fabric was obtained. The product was transferred to the first setting machine 61 for cooling and setting, to give a fabric comprising an inserted modified PVB cast layer. The fabric comprising an inserted modified PVB cast layer was wound by the first winder 70. The cross-sectional view of the fabric comprising an inserted modified PVB cast layer was shown in FIG. 8, in which A1 indicated the first fabric layer, A2 indicated the second fabric layer, and B indicated the modified PVB layer.

Figure 9:
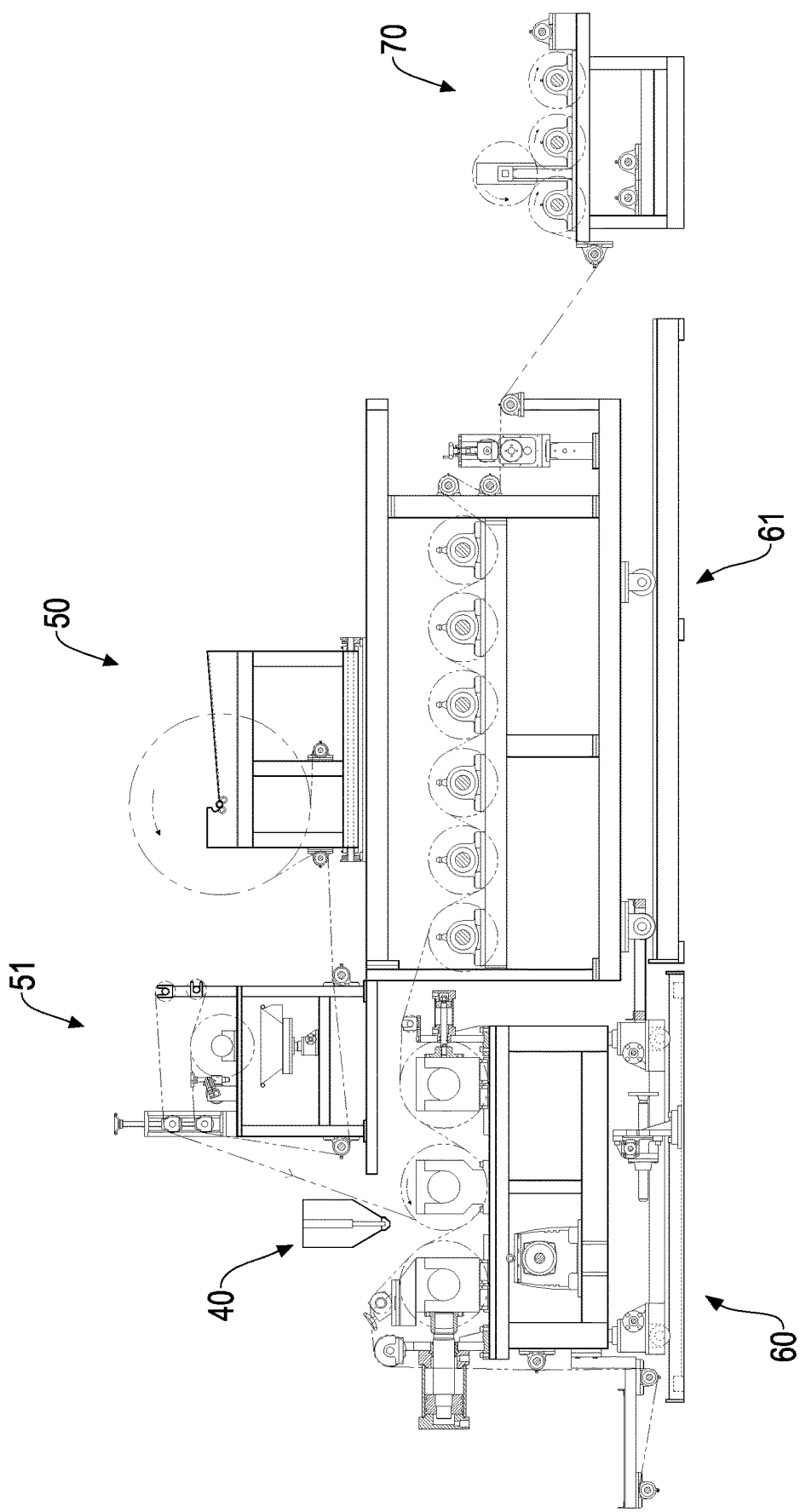
FIG. 9 is the schematic diagram of the production line used in the Preparation Example 4 of the present invention.

Preparation Example 4: Single-Sided Al Metalized PET Film Comprising a Modified PVB Cast Layer Prepared by the Modified PVB Material of the Present Invention As shown in FIG. 9, first, the Al metalized PET film was sent by the second sending machine 50, and transferred to the second gluing machine 51. In the second gluing machine 51, an adhesive was coated on the Al-plated side of the Al metalized PET film, in which the amount of the adhesive was less than 20 g/m².

The above-mentioned modified PVB pellets were loaded into the feed hopper 401 of the casting machine 40. The directions of the casting machine 40 shown in FIG. 4 and FIG. 9 were different, and the structure of the casting machine 40 was as shown in FIG. 4. The modified PVB pellets were molten after they passed through the zones 402a to 402k of the screw 402, and the molten modified PVB material passed through the zones 403a to 403k of the die 403 was casted on the adhesive-coated side of the Al metalized PET film. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

Figure 10:
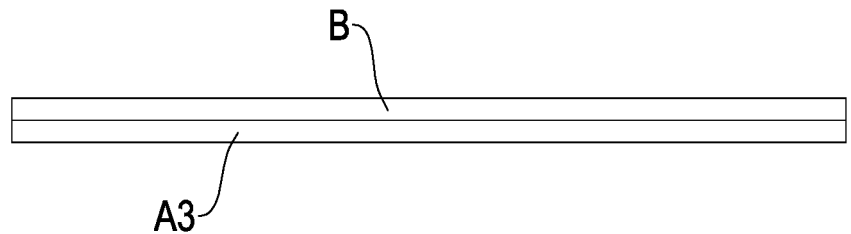
FIG. 10 is the cross-sectional view of one embodiment of the modified PVB product of the present invention.

The Al metalized PET film casted with a layer of the modified PVB material was transferred to the first embossing machine 60 for embossing treatment; and then transferred to the first setting machine 61 for cooling and setting, to give a single-sided Al metalized PET film comprising a modified PVB cast layer. The single-sided Al metalized PET film comprising a modified PVB cast layer was wound by the first winder 70. The cross-sectional view of the single-sided Al metalized PET film comprising a modified PVB cast layer was shown in FIG. 10, in which A3 indicated the Al metalized PET layer, and B indicated the modified PVB layer.

Similarly, when a thicker modified PVB cast layer was needed to be formed on the side of the Al metalized PET film, the casting step could be simply repeated on the same side. In addition, as described in Preparation Example 2, the modified PVB material could be casted on the other side of the single-sided Al metalized PET film comprising a modified PVB cast layer, to give a double-sided Al metalized PET film comprising two modified PVB cast layers (not shown in figures).

Preparation Example 5: Artificial Leather with an Inserted Mesh Fabric Prepared by the Modified PVB Material of the Present Invention Casting on Reverse Side As shown in FIG. 7, first, a mesh fabric was sent by the second sending machine 50 which had a shorter sending distance, and transferred to the second gluing machine 51. In the second gluing machine 51, an adhesive was coated on one side of the mesh fabric, in which the amount of the adhesive was less than 20 g/m². The sending distance between the second sending machine 50 and the second gluing machine 51 was shorter, and this was advantageous for keeping the mesh structure of the mesh fabric at the beginning of the preparation.

The above-mentioned modified PVB pellets were loaded into the feed hopper 401 of the casting machine 40. The directions of the casting machine 40 shown in FIG. 4 and FIG. 7 were different, and the structure of the casting machine 40 was as shown in FIG. 4. The modified PVB pellets were molten after they passed through the zones 402a to 402k of the screw 402, and the molten modified PVB material passed through the zones 403a to 403k of the die 403 was casted on the adhesive-coated side of the mesh fabric. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

The mesh fabric casted with a layer of the modified PVB material was transferred to the first embossing machine 60 for embossing treatment; and then transferred to the first setting machine 61 for cooling and setting, to give a single-sided mesh fabric comprising a modified PVB cast layer. The single-sided mesh fabric comprising a modified PVB cast layer was wound by the first winder 70.

Casting on Front Side

Next, as shown in FIG. 7, the single-sided mesh fabric comprising a modified PVB cast layer was sent by the first sending machine 30, and transferred to the first gluing machine 31. In the first gluing machine 31, an adhesive was coated on the other side (not casted with the modified PVB layer yet) of the single-sided mesh fabric comprising a modified PVB cast layer, and the single-sided mesh fabric with an adhesive coating on the other side was transferred to the oven 32 and heated at a temperature of 100° C. to 130° C., to evaporate the solvent in the adhesive.

The above-mentioned modified PVB pellets were loaded into the feed hopper 401 of the casting machine 40. The directions of the casting machine 40 shown in FIG. 4 and FIG. 7 were different, and the structure of the casting machine 40 was as shown in FIG. 4. The modified PVB pellets were molten after they passed through the zones 402a to 402k of the screw 402, and the molten modified PVB material passed through the zones 403a to 403k of the die 403 was casted on the other adhesive-coated side of the single-sided mesh fabric comprising a cast layer. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

Figure 11:
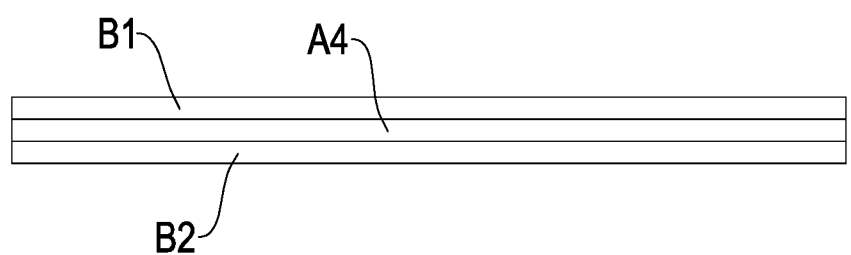
FIG. 11 is the cross-sectional view of one embodiment of the modified PVB product of the present invention.

The mesh fabric casted with two layers of the modified PVB material was transferred to the first embossing machine 60 for embossing treatment; and then transferred to the first setting machine 61 for cooling and setting, to give an artificial leather with an inserted mesh fabric. The artificial leather with an inserted mesh fabric was wound by the first winder 70. The cross-sectional view of the artificial leather with an inserted mesh fabric was shown in FIG. 11, in which A4 indicated the mesh fabric layer, B1 indicated the first modified PVB layer, and B2 indicated the second modified PVB layer.

In addition, when a thicker modified PVB cast layer was needed to be formed on the front side (F side) or the reverse side (R side) of the mesh fabric, the casting step could be simply repeated on the desired side.

Preparation Example 6: Foamed Artificial Leather Prepared by the Modified PVB Material of the Present Invention Single Side Casting As shown in FIG. 7, a fabric (woven or non-woven) was sent by the first sending machine 30, and the fabric sent by the first sending machine 30 was transferred to the first gluing machine 31. In the first gluing machine 31, an adhesive was coated on one side of the fabric. The adhesive-coated fabric was transferred to the oven 32 and heated at a temperature of 100° C. to 130° C., to evaporate the solvent in the adhesive.

The above-mentioned modified PVB pellets were mixed with AC foaming agent pellets at a weight ratio of 100:5-7, and loaded into the feed hopper 401 of the casting machine 40. The directions of the casting machine 40 shown in FIG. 4 and FIG. 7 were different, and the structure of the casting machine 40 was as shown in FIG. 4. The modified PVB pellets were molten after they passed through the zones 402a to 402k of the screw 402, and the molten modified PVB material passed through the zones 403a to 403k of the die 403 was casted on the side of the adhesive-coated fabric. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

The fabric casted with a layer of the mixture of the modified PVB material and the AC foaming agent was transferred to the first setting machine 61 for cooling and setting, to give a single-sided fabric comprising a modified PVB-AC mixture cast layer. The single-sided fabric comprising a modified PVB-AC mixture cast layer was wound by the first winder 70.

In addition, when a thicker modified PVB cast layer was needed to be formed on the side of the fabric, the casting step could be simply repeated on the same side.

Foaming

The single-sided fabric comprising a modified PVB-AC mixture cast layer was foamed to obtain a single-sided fabric comprising a foamed modified PVB cast layer. The foaming temperature was 160° C. to 250° C., and the foaming time is 1.5 minutes to 2 minutes.

Figure 12:
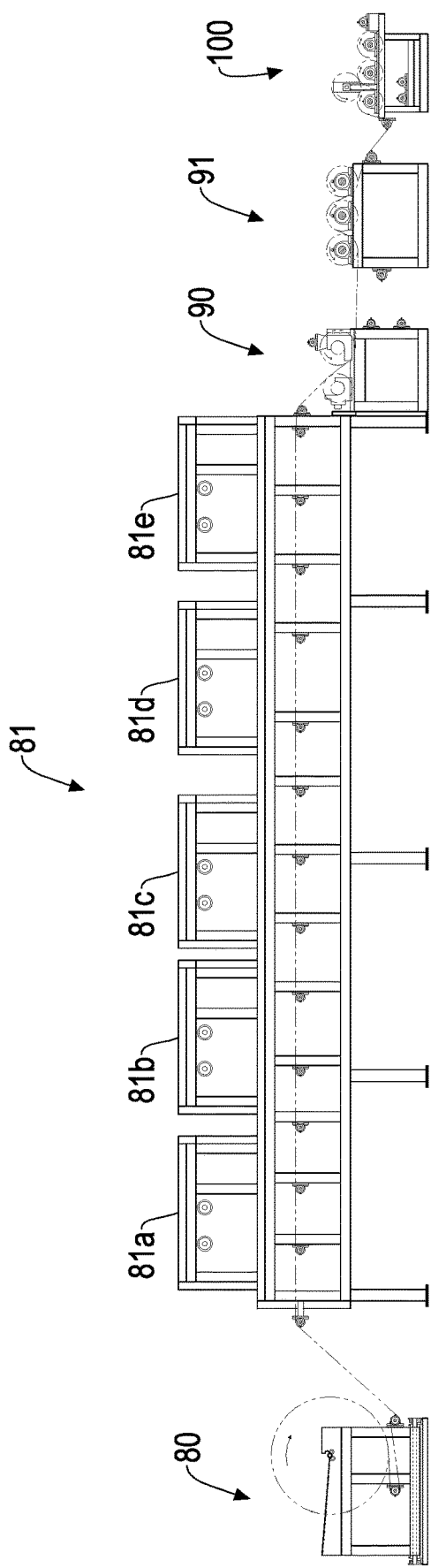
FIG. 12 is the schematic diagram of the production line for foaming used in the Preparation Examples of the present invention.
Figure 13:
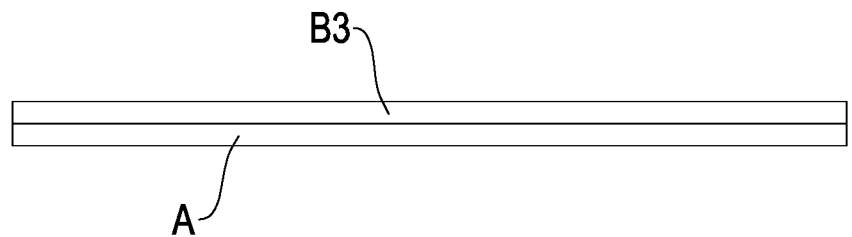
FIG. 13 is the cross-sectional view of one embodiment of the modified PVB product of the present invention.

As shown in FIG. 12, the single-sided fabric comprising a modified PVB-AC mixture cast layer was sent by the third sending machine 80, and transferred to the foaming machine 81. In the foaming machine 81, the single-sided fabric comprising a modified PVB-AC mixture cast layer was heated in the zones 81a to 81e of the foaming machine 81, in which the temperature of the zone 81e reached 160° C. to 250° C., and the temperatures of each zone could be different. The single-sided fabric comprising a modified PVB-AC mixture cast layer after the foaming heat treatment was transferred to the second embossing machine 90 refluxed with cold water at 10° C. for embossment; and then transferred to the second setting machine 91 for cooling and setting, to give a foamed artificial leather. The foamed artificial leather was wound by the second winder 100. The cross-sectional view of the foamed artificial leather was shown in FIG. 13, in which A indicated the fabric layer, and B3 indicated the foamed modified PVB layer.

Preparation Example 7: Foamed Single Film Prepared by the Modified PVB Material of the Present Invention Single Layer Casting First, as shown in FIG. 3, the above-mentioned modified PVB pellets were mixed with AC foaming agent pellets at a weight ratio of 100:5-7, and loaded into the feed hopper 401 of the casting machine 40. The directions of the casting machine 40 shown in FIG. 3 and FIG. 4 were different, and the structure of the casting machine 40 was as shown in FIG. 4. The modified PVB pellets were molten after they passed through the zones 402a to 402k of the screw 402, and the molten modified PVB material passed through the zones 403a to 403k of the die 403 was casted and sent into the space between the first embossing roller 601 and the rubber roller 602 of the first embossing machine 60. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

The cast layer of the modified PVB material was transferred to the first setting machine 61 for cooling and setting, to give a modified PVB cast film. The modified PVB cast film was wound by the first winder 70.

Foaming

The modified PVB cast film was foamed to obtain a foamed single film. The foaming temperature was 160° C. to 250° C., and the foaming time is 1.5 minutes to 2 minutes.

Figure 14:
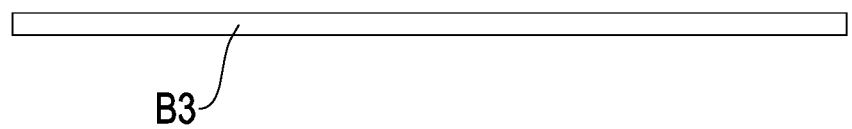
FIG. 14 is the cross-sectional view of one embodiment of the modified PVB product of the present invention.

As shown in FIG. 12, the modified PVB cast film was sent by the third sending machine 80 and transferred to the foaming machine 81. In the foaming machine 81, the modified PVB cast film was heated in the zones 81a to 81e of the foaming machine 81, in which the temperature of the zone 81e reached 160° C. to 250° C., and the temperatures of each zone could be different. The modified PVB cast film after the foaming heat treatment was transferred to the second embossing machine 90 refluxed with cold water at 10° C. for embossment; and then transferred to the second setting machine 91 for cooling and setting, to give a foamed single film. The foamed single film was wound by the second winder 100. The cross-sectional view of the foamed single film was shown in FIG. 14, in which B3 indicated the foamed modified PVB layer.

Preparation Example 8: Modified PVB Cast Film Prepared by the Modified PVB Material of the Present Invention First, as shown in FIG. 3, the above-mentioned modified PVB pellets were loaded into the feed hopper 401 of the casting machine 40. The directions of the casting machine 40 shown in FIG. 3 and FIG. 4 were different, and the structure of the casting machine 40 was as shown in FIG. 4. The modified PVB pellets were molten after they passed through the zones 402a to 402k of the screw 402, and the molten modified PVB material passed through the zones 403a to 403k of the die 403 was casted and sent into the space between the first embossing roller 601 and the rubber roller 602 of the first embossing machine 60. The temperature setting of the casting machine 40 included: the temperature of the screw 402 reached 135° C. to 165° C. at the zone 402k, and the temperatures of each zone of the screw 402 could be different; the temperature of the die 403 reached 155° C. to 175° C. at the zone 403k, and the temperatures of each zone of the die 403 were the same. The number of the zones of the screw 402 and that of the die 403 in the casting machine 40 were determined independently, and their width could be set according to the practical needs of products. In this Example, both the screw 402 and the die 403 had 11 zones. The numbers of the zones of the screw 402 and the die 403 could be 8 to 30 in general, but not limited thereto.

Figure 15:
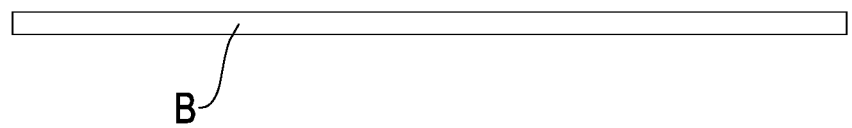
FIG. 15 is the cross-sectional view of one embodiment of the modified PVB product of the present invention.

The cast layer of the modified PVB material was transferred to the first embossing machine 60 for embossing treatment; and then transferred to the first setting machine 61 for cooling and setting, to give a modified PVB film. The modified PVB film was wound by the first winder 70. The cross-sectional view of the modified PVB film was shown in FIG. 15, in which B indicated the modified PVB layer.

Preparation Example 9: Modified PVB Calendar Film Prepared by the Modified PVB Material of the Present Invention First, as shown in FIG. 2, the above-mentioned modified PVB material was transferred from the second rolling mill X13 to the multi-roller X20 and calendered into a film at 170° C. to 185° C. In FIG. 2, the multi-roller X20 comprised a first roller X201, a second roller X202, a third roller X203, and a fourth roller X204 respectively at a temperature of 170° C., 175° C., 180° C., and 185° C. The number of the rollers in the multi-roller X20 was determined according to the practical needs of products. Greater number of rollers resulted in higher evenness of the resulting films. The calendar film prepared by the modified PVB material was transferred in the third embossing machine X30 for embossing treatment; and then transferred to the third setting machine X32 for cooling and setting, to give a modified PVB calendar film. The modified PVB calendar film was wound by the third winder X33. The cross-sectional view of the modified PVB calendar film was shown in FIG. 15, in which B indicated the modified PVB layer.

Figure 16:
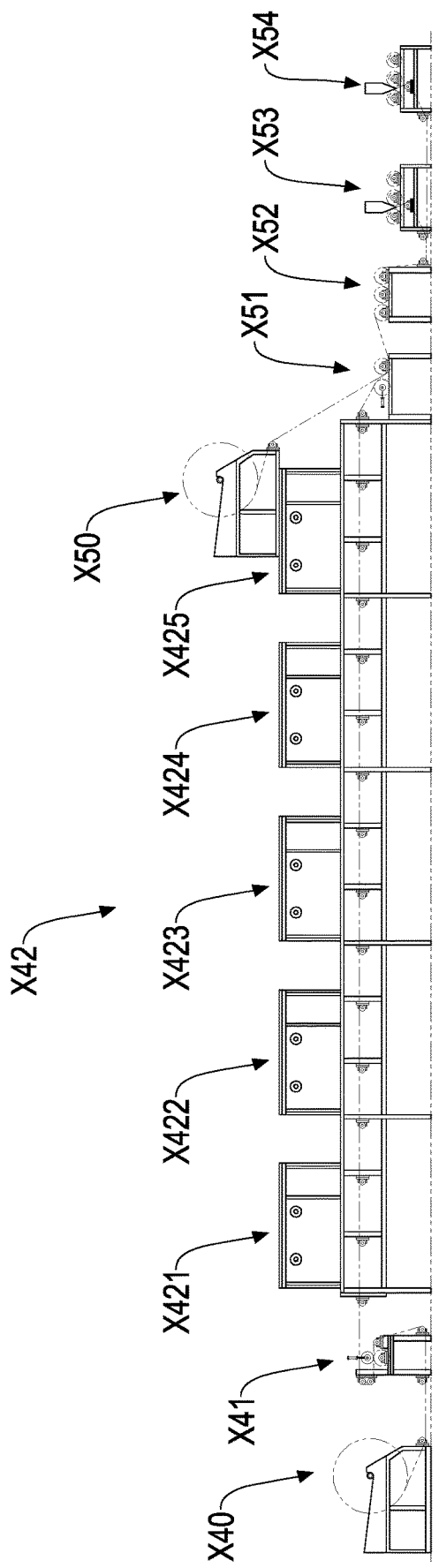
FIG. 16 is the schematic diagram of the production line used in the Preparation Examples 10-1, 11-1, 13 and 14 of the present invention.

Preparation Example 10-1: Single-Sided Fabric Comprising a Modified PVB Calendar Layer Prepared by the Modified PVB Material of the Present Invention The modified PVB calendar layer obtained in Preparation Example 9 was used. As shown in FIG. 16, first, a fabric (an Oxford fabric or a terylene fabric) was sent by the fourth sending machine X40, and transferred to the third gluing machine X41. In the third gluing machine X41, an adhesive was coated on one side of the fabric, in which the amount of the adhesive was equal to or less than 20 g/m$^2$, and the adhesive-coated fabric was transferred to the oven set X42 comprising a first oven X421, a second oven X422, a third oven X423, a fourth oven X424, and a fifth oven X425 respectively at a temperature of 150° C., 160° C., 170° C., 180° C., and 165° C., to evaporate the solvent in the adhesive. The number of the ovens in the oven set X42 was determined according to the practical needs of products. In this Example, the oven set X42 had 5 ovens. The numbers of the ovens of the oven set X42 could be 5 to 10 in general, but not limited thereto. The adhesive-coated fabric was then transferred to the fourth embossing machine X51.

In addition, the modified PVB calendar layer was sent by the fifth sending machine X50 and transferred to the fourth embossing machine X51. After that, the modified PVB calendar layer was bound to the adhesive-coated side of the fabric, and pressed for binding by a flat roll with a force of 12 kg. After the fabric was bound to the modified PVB calendar layer, it was transferred to the fourth setting machine X52 for cooling and setting, to give a single-sided fabric comprising a modified PVB calendar layer. The single-sided fabric comprising a modified PVB calendar layer was wound by the fourth winder X54. The cross-sectional view of the single-sided fabric comprising a modified PVB calendar layer was shown in FIG. 5, in which A indicated the fabric layer, and B indicated the modified PVB layer.

When a fabric which needed no adhesive (such as a non-woven fabric or a knitted fabric) was used, the adhesive-coated fabric could be sent by a sending rack X31, transferred to the third embossing machine X30, and then bound to a modified PVB calendar layer in the production line shown in FIG. 2.

Figure 17:
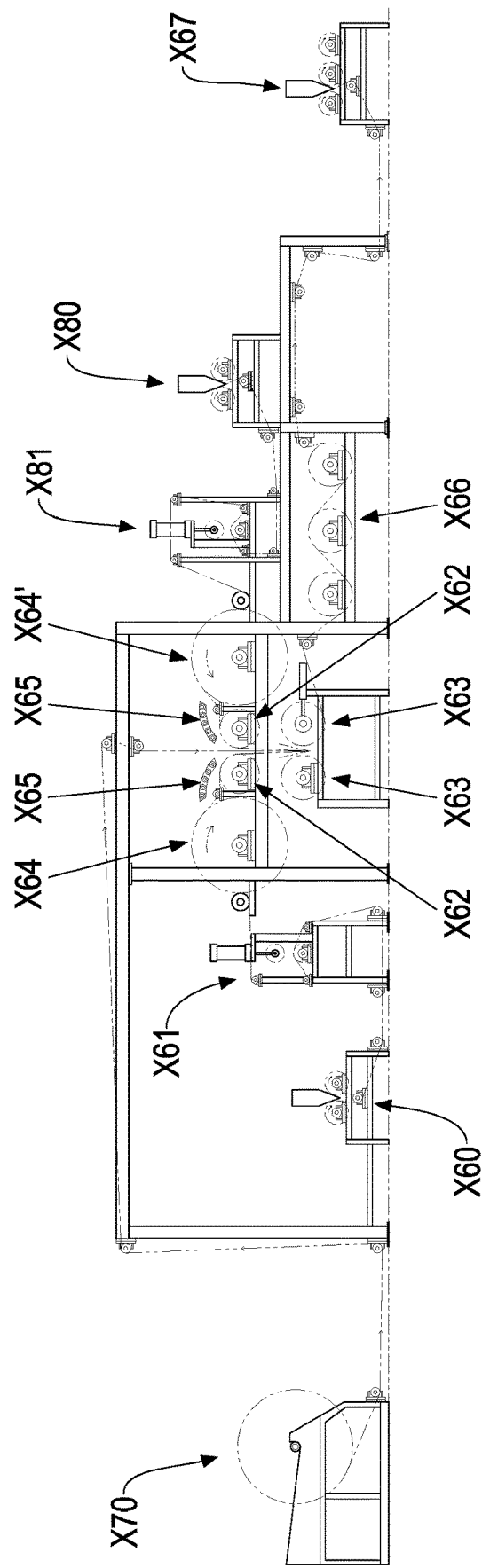
FIG. 17 is the schematic diagram of the production line used in the Preparation Examples 10-2, 11-2 and 12 of the present invention.

Preparation Example 10-2: Single-Sided Fabric Comprising a Modified PVB Calendar Layer Prepared by the Modified PVB Material of the Present Invention First, as shown in FIG. 17, a fabric was sent by the seventh sending machine X70, and the fabric went through first heating rollers X62 and to the space between the second embossing rollers X63. The temperature of the first heating rollers X62 was 130° C.

The modified PVB calendar layer obtained in Preparation Example 9 was used. First, the modified PVB calendar layer was sent by the sixth sending machine X60, and transferred to the fourth gluing machine X61. In the fourth gluing machine X61, an adhesive was coated on one side of the modified PVB calendar layer, in which the amount of the adhesive was equal to or less than 20 g/m². The adhesive-coated modified PVB calendar layer was transferred to a second heating rollers X64, then to the space between the first heating rollers X62, to evaporate the solvent in the adhesive. The adhesive-coated modified PVB calendar layer was then transferred to the space between the second embossing rollers X63, in which the second embossing roller X63 contacting the modified PVB calendar layer was a roller with engraved pattern, and the second embossing roller X63 contacting the fabric was a rubber roller. The temperature of the second heating rollers X64 was also 130° C. There were heating covers X65 disposed respectively above the second heating rollers X64, which had a higher temperature, such as 200° C., and was used to heat the first heating rollers X62 and the second heating rollers X64.

After that, the adhesive-coated side of the modified PVB calendar layer was bound to the fabric, and pressed for binding by a flat roll with a force of 12 kg. After the fabric was bound to the modified PVB calendar layer, it was transferred to a setting roller X66 for cooling and setting, to give a single-sided fabric comprising a modified PVB calendar layer. The single-sided fabric comprising a modified PVB calendar layer was wound by the fifth winder X67. The cross-sectional view of the single-sided fabric comprising a modified PVB calendar layer was shown in FIG. 5, in which A indicated the fabric layer, and B indicated the modified PVB layer.

Preparation Example 11-1: Double-Sided Fabric Comprising Two Modified PVB Calendar Layers Prepared by the Modified PVB Material of the Present Invention The single-sided fabric comprising a modified PVB calendar layer obtained in Preparation Example 10-1 was used. As shown in FIG. 16, first, a single-sided fabric comprising a modified PVB calendar layer was sent by the fourth sending machine X40, and transferred to the third gluing machine X41. In the third gluing machine X41, an adhesive was coated on the other side of the fabric (not in contact with the modified PVB calendar layer) of the single-sided fabric comprising a modified PVB calendar layer, in which the amount of the adhesive was equal to or less than 20 g/m², and the adhesive-coated single-sided fabric comprising a modified PVB calendar layer was transferred to the oven set X42 comprising a first oven X421, a second oven X422, a third oven X423, a fourth oven X424, and a fifth oven X425 respectively at a temperature of 150° C., 160° C., 170° C., 180° C., and 165° C., to evaporate the solvent in the adhesive. The number of the ovens in the oven set X42 was determined according to the practical needs of products. In this Example, the oven set X42 had 5 ovens. The numbers of the ovens of the oven set X42 could be 5 to 10 in general, but not limited thereto. The adhesive-coated single-sided fabric comprising a modified PVB calendar layer was then transferred to the fourth embossing machine X51.

In addition, another modified PVB calendar layer was sent by the fifth sending machine X50 and transferred to the fourth embossing machine X51. After that, the modified PVB calendar layer was bound to the adhesive-coated side of the single-sided fabric comprising a modified PVB calendar layer, and pressed for binding by a flat roll with a force of 12 kg. After the modified PVB calendar layer was bound to the single-sided fabric comprising a modified PVB calendar layer, it was transferred to the fourth setting machine X52 for cooling and setting, to give a double-sided fabric comprising two modified PVB calendar layers. The double-sided fabric comprising two modified PVB calendar layers was wound by the fourth winder X54. The cross-sectional view of the double-sided fabric comprising two modified PVB calendar layers was shown in FIG. 6, in which A indicated the fabric layer, B1 indicated the first modified PVB layer, and B2 indicated the second modified PVB layer.

When a fabric which needed no adhesive (such as a non-woven fabric or a knitted fabric) was used, the adhesive-coated single-sided fabric comprising a modified PVB calendar layer could be sent by a sending rack X31, transferred to the third embossing machine X30, and then bound to a modified PVB calendar layer in the production line shown in FIG. 2.

Preparation Example 11-2: Double-Sided Fabric Comprising Two Modified PVB Calendar Layers Prepared by the Modified PVB Material of the Present Invention First, as shown in FIG. 17, a fabric was sent by the seventh sending machine X70, and the fabric went through first heating rollers X62 and to the space between the second embossing rollers X63. The temperature of the first heating rollers X62 was 130° C.

The modified PVB calendar layer obtained in Preparation Example 9 was used. First, the modified PVB calendar layer was sent by the sixth sending machine X60, and transferred to the fourth gluing machine X61. In the fourth gluing machine X61, an adhesive was coated on one side of the modified PVB calendar layer, in which the amount of the adhesive was equal to or less than 20 g/m². The adhesive-coated modified PVB calendar layer was transferred to a second heating roller X64, then to the space between the first heating rollers X62, to evaporate the solvent in the adhesive. The adhesive-coated modified PVB calendar layer was then transferred to the space between the second embossing rollers X63. In addition, another modified PVB calendar layer was sent by the eighth sending machine X80, and transferred to the fifth gluing machine X81, an adhesive was coated on one side of the another modified PVB calendar layer, in which the amount of the adhesive was equal to or less than 20 g/m². Said another adhesive-coated modified PVB calendar layer was transferred to another second heating roller X64', then to the space between the first heating rollers X62, to evaporate the solvent in the adhesive. Said another adhesive-coated modified PVB calendar layer was then transferred to the space between the second embossing rollers X63. The second embossing rollers X63 had a roller with engraved pattern and a rubber roller, and they could be used according to product needs. The temperature of the second heating rollers X64 was also 130° C. There was heating covers X65 disposed respectively above the second heating rollers X64, which had a higher temperature, such as 200° C., and was used to heat the first heating rollers X62 and the second heating rollers X64.

After that, the two adhesive-coated sides of the modified PVB calendar layers were bound to the two sides of the fabric respectively, and pressed for binding by a flat roll with a force of 12 kg. After the fabric was bound to the modified PVB calendar layers, it was transferred to a setting roller X66 for cooling and setting, to give a double-sided fabric comprising two modified PVB calendar layers. The double-sided fabric comprising two modified PVB calendar layers was wound by the fifth winder X67. The cross-sectional view of the double-sided fabric comprising two modified PVB calendar layers was shown in FIG. 6, in which A indicated the fabric layer, B1 indicated the first modified PVB layer, and B2 indicated the second modified PVB layer.

Preparation Example 12: Fabric Comprising an Inserted Modified PVB Calendar Layer Prepared by the Modified PVB Material of the Present Invention The single-sided fabric comprising a modified PVB calendar layer obtained in Preparation Example 10-1 or 10-2 was used. First, the single-sided fabric comprising a modified PVB calendar layer was sent by the sixth sending machine X60, and transferred to the fourth gluing machine X61. In the fourth gluing machine X61, an adhesive was coated on the other side of the modified PVB calendar layer (not in contact with the fabric) of the single-sided fabric comprising a modified PVB calendar layer, in which the amount of the adhesive was equal to or less than 20 g/m². The adhesive-coated single-sided fabric comprising a modified PVB calendar layer was transferred to a second heating roller X64, then to the space between the first heating rollers X62, to evaporate the solvent in the adhesive. The adhesive-coated single-sided fabric comprising a modified PVB calendar layer was then transferred to the space between the second embossing rollers X63. The temperature of the first heating rollers X62 was 130° C.

As shown in FIG. 17, a second fabric was sent by the seventh sending machine X70, and the second fabric went through first heating rollers X62 and to the space between the second embossing rollers X63 and contacted the adhesive-coated single-sided fabric comprising a modified PVB calendar layer, in which the second embossing roller X63 contacting the modified PVB calendar layer was a roller with engraved patterns, and the second embossing roller X63 contacting the fabric was a rubber roller. The temperature of the second heating rollers X64 was also 130° C. There were heating covers X65 disposed respectively above the second heating rollers X64, which had a higher temperature, such as 200° C., and was used to heat the first heating rollers X62 and the second heating rollers X64.

After that, the adhesive-coated single-sided fabric comprising a modified PVB calendar layer was bound to the second fabric, and pressed for binding by a flat roll with a force of 12 kg. After the fabric was bound to the single-sided fabric comprising a modified PVB calendar layer, it was transferred to a setting roller X66 for cooling and setting, to give a fabric comprising an inserted modified PVB calendar layer. The fabric comprising an inserted modified PVB calendar layer was wound by the fifth winder X67. The cross-sectional view of the fabric comprising an inserted modified PVB calendar layer was shown in FIG. 8, in which A1 indicated the first fabric layer, A2 indicated the second fabric layer, and B indicated the modified PVB layer.

Preparation Example 13: Single-Sided Fabric Comprising a Foamed Modified PVB Calendar Layer Prepared by the Modified PVB Material of the Present Invention In this preparation example, a modified PVB material comprising AC foaming agent (azodicarbonamide) was used, such as the modified PVB material of Example 6 (comprising 5 parts by weight of azodicarbonamide), to prepare a modified PVB calendar film comprising azodicarbonamide by the method described in Preparation Example 9.

As shown in FIG. 16, first, a fabric (an Oxford fabric or a terylene fabric) was sent by the fourth sending machine X40, and transferred to the third gluing machine X41. In the third gluing machine X41, an adhesive was coated on one side of the fabric, in which the amount of the adhesive was equal to or less than 20 g/m², and the adhesive-coated fabric was transferred to the oven set X42 comprising a first oven X421, a second oven X422, a third oven X423, a fourth oven X424, and a fifth oven X425 respectively at a temperature of 150° C., 160° C., 170° C., 180° C., and 165° C., to evaporate the solvent in the adhesive. The number of the ovens in the oven set X42 was determined according to the practical needs of products. In this Example, the oven set X42 had 5 ovens. The numbers of the ovens of the oven set X42 could be 5 to 10 in general, but not limited thereto. The adhesive-coated fabric was then transferred to the fourth embossing machine X51.

In addition, the modified PVB calendar film comprising azodicarbonamide was sent by the fifth sending machine X50 and transferred to the fourth embossing machine X51. After that, the modified PVB calendar film comprising azodicarbonamide was bound to the adhesive-coated side of the fabric, and pressed for binding by a flat roll with a force of 12 kg. After the fabric was bound to the modified PVB calendar film comprising azodicarbonamide, it was transferred to the fourth setting machine X52 for cooling and setting, to give a single-sided fabric comprising a modified PVB calendar layer. The single-sided fabric comprising a modified PVB calendar layer was wound by the fourth winder X54.

After that, as shown in FIG. 16, first, the single-sided fabric comprising a modified PVB calendar layer was sent by the fourth sending machine X40, and the single-sided fabric comprising a modified PVB calendar layer was directly transferred to the oven set X42 comprising a first oven X421, a second oven X422, a third oven X423, a fourth oven X424, and a fifth oven X425 respectively at a temperature of 160° C., 170° C., 180° C., 190° C., and 165° C. The temperature of the oven set X42 foamed the modified PVB calendar layer comprised in the single-sided fabric comprising a modified PVB calendar layer because the modified PVB calendar layer comprised AC foaming agent (azodicarbonamide) to give a foamed modified PVB calendar layer. The single-sided fabric comprising a foamed modified PVB calendar layer was then transferred to the fourth embossing machine X51 for embossing treatment; transferred to the fourth setting machine X52 for cooling and setting; and then wound by the fourth winder X54. The above embossing step could be skipped, and the foamed modified PVB calendar layer could be embossed in follow-up processing treatments. The cross-sectional view of the single-sided fabric comprising a foamed modified PVB calendar layer was shown in FIG. 13, in which A indicated the fabric layer, and B3 indicated the foamed modified PVB layer.

Preparation Example 14: Artificial Leather with an Inserted Fabric Prepared by the Modified PVB Material of the Present Invention In this preparation example, a modified PVB material comprising AC foaming agent (azodicarbonamide) was used, such as the modified PVB material of Example 6 (comprising 5 parts by weight of azodicarbonamide), to prepare a modified PVB calendar film comprising azodicarbonamide by the method described in Preparation Example 9. After that, the single-sided fabric comprising a modified PVB calendar layer comprising azodicarbonamide obtained in Preparation Example 10-1 or 10-2 was prepared and used.

As shown in FIG. 16, first, a single-sided fabric comprising a modified PVB calendar layer was sent by the fourth sending machine X40, and transferred to the third gluing machine X41. In the third gluing machine X41, an adhesive was coated on the other side of the modified PVB calendar layer (not in contact with the fabric) of the single-sided fabric comprising a modified PVB calendar layer, in which the amount of the adhesive was equal to or less than 20 g/m$^2$, and the adhesive-coated single-sided fabric comprising a modified PVB calendar layer was transferred to the oven set X42 comprising a first oven X421, a second oven X422, a third oven X423, a fourth oven X424, and a fifth oven X425 respectively at a temperature of 110° C., 120° C., 130° C., 140° C., and 135° C. To avoid excessive loss of azodicarbonamide, the temperature of the oven set X42 at this stage was not higher than 140° C. The number of the ovens in the oven set X42 was determined according to the practical needs of products. In this Example, the oven set X42 had 5 ovens. The numbers of the ovens of the oven set X42 could be 5 to 10 in general, but not limited thereto. The adhesive-coated single-sided fabric comprising a modified PVB calendar layer was then transferred to the fourth embossing machine X51.

In addition, a PU film on a release paper was sent by the fifth sending machine X50 and transferred to the fourth embossing machine X51. After that, the surface of the PU film not contacting the release paper was bound to the adhesive-coated side of the single-sided fabric comprising a modified PVB calendar layer, and pressed for binding by a flat roll with a force of 12 kg. After the PU film was bound to the single-sided fabric comprising a modified PVB calendar layer, it was transferred to the fourth setting machine X52 for cooling and setting, to give a fabric inserted between a modified PVB calendar layer and a PU layer. After that, the release paper was separated from the fabric inserted between a modified PVB calendar layer and a PU layer, and wound by the sixth winder X53. The fabric inserted between a modified PVB calendar layer and a PU layer was wound by the fourth winder X54.

Figure 18:
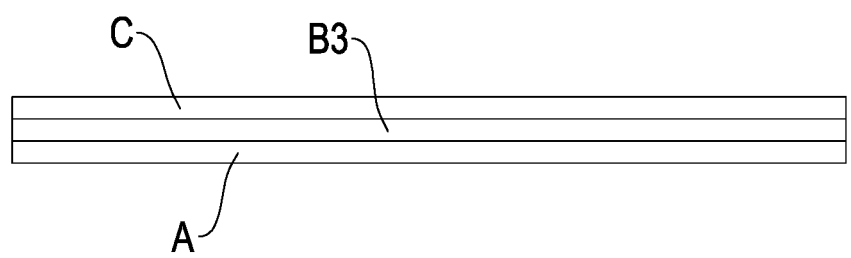
FIG. 18 is the cross-sectional view of one embodiment of the modified PVB product of the present invention.

After that, the fabric inserted between a modified PVB calendar layer and a PU layer was sent by the fourth sending machine X40, and the fabric inserted between a modified PVB calendar layer and a PU layer was directly transferred to the oven set X42 comprising a first oven X421, a second oven X422, a third oven X423, a fourth oven X424, and a fifth oven X425 respectively at a temperature of 160° C., 170° C., 180° C., 190° C., and 165° C. The temperature of the oven set X42 foamed the modified PVB calendar layer comprised in the fabric inserted between a modified PVB calendar layer and a PU layer to give a fabric inserted between a foamed modified PVB calendar layer and a PU layer. The fabric inserted between a foamed modified PVB calendar layer and a PU layer was then transferred to the fourth embossing machine X51 for embossing treatment; and then transferred to the fourth setting machine X52 for cooling and setting, to give an artificial leather with an inserted mesh fabric. The artificial leather with an inserted mesh fabric was wound by the fourth winder X54. The cross-sectional view of the artificial leather with an inserted mesh fabric was shown in FIG. 18, in which A indicated the fabric layer, B3 indicated the foamed modified PVB layer, and C indicated the PU layer.

Peel Strength Test of PVB Products

The components of Example 4-1 and Comparative Example 2 were used to prepare the modified PVB materials in the form of pellets by the above preparation method (I), and then the modified PVB materials were used to prepare modified PVB products in accordance with Preparation Example 1, respectively. The modified PVB products were cut to give specimens 7A and 7B had a size of 130 mm×30 mm.

In addition, the components of Example 4-1 and Comparative Example 2 were used to prepare the modified PVB materials by the above preparation method (II), and then the modified PVB materials were used to prepare modified PVB products in accordance with Preparation Example 10-1, respectively. The modified PVB products were cut to give specimens 7C and 7D having a size of 130 mm×30 mm.

The modified PVB products of Preparation Examples 1 and 10-1 comprised a modified PVB layer (or a PVB layer) and a fabric, in which a synthetic fabric (in 600D×300D, 64T) was used as the base layer (i.e., the fabric). The adhesive used in Preparation Examples 1 and 10-1 was polyurethane glue.

Specimens were prepared for the peel strength test. The PVB layer (the layer made of the modified PVB material of Example 4-1 or the un-modified PVB leftover material of Comparative Example 2) and the base layer of each specimen were split from one end of the long side of the specimen for a length of 25 mm. When the longitudinal direction of the specimens was the same with the longitudinal direction of the PVB product, they are marked as machine direction (MD). When the longitudinal direction of the specimens was the same with the cross direction of the PVB product, they are marked as cross direction (CD).

The peel strength was tested by HD-A604S Peel Testing Machine (in compliance with the test standard GB/T16491). During the test, the temperature was 23±2° C., the relative humidity was 60±5%, and the distance between the two clamps was 25 mm. The split parts of each specimen were separated, the PVB cast layer was connected to the upper clamp, the base layer was connected to the lower clamp, and the un-split end of the specimen was aligned with the median line between the two clamps to balance the applied forces. After that, the clamps were pulled outward at a testing speed of 100 millimeters per minute (mm/min), and the test ended after the PVB cast layer and the base layer of the specimen were completely separated. The value of peel strength in cross direction (CD) or in machine direction (MD) was the average value obtained from three specimens. The results were shown in Table 5.

TABLE 5

| Specimen | 7A | 7B | 7C | 7D |
|---|---|---|---|---|
| Material | Example 4-1 | Comparative Example 2 | Example 4-1 | Comparative Example 2 |
| Method for preparing film | Pellet casting | Pellet casting | Direct calendering | Direct calendering |
| Preparation method | Preparation Example 1 | Preparation Example 1 | Preparation Example 10-1 | Preparation Example 10-1 |
| PVB layer thickness (mm) | 0.2 | 0.2 | 0.2 | 0.2 |
| Adhesive amount (g/m$^2$) | 20 | 20 | 20 | 20 |
| Peel strength in CD (kgf) | 1.3 to 2.1 | 0.2 to 0.8 | 1.3 to 2.1 | 0.2 to 0.8 |
| Peel strength in MD (kgf) | 1.8 to 2.5 | 0.5 to 1.0 | 1.8 to 2.5 | 0.5 to 1.0 |

From Table 5, it was clear that the PVB product using the modified PVB material of Example 4-1 had higher peel strength in CD and peel strength in MD between the PVB layer and the base layer than those of the PVB product using the material of Comparative Example 2. When the PVB layer made of the material of Comparative Example 2 was applied for a PVB product, the PVB layer could be peeled off easily. However, the modified PVB material of Example 4 significantly increased the peel strength, and the modified PVB layer could not be easily peeled off, so it was advantageous to be applied in PVB products.

In addition, if a foaming step was added in the preparation process, the temperatures of the zones 81a to 81e of the foaming machine 81 were gradually increasing, such as in the sequence of 180° C., 195° C., 210° C., 225° C. and 180° C., which could be adjusted according to the amount of the foaming agent. The peel strength of the foamed PVB layer was increased by 0.2 kgf to 0.4 kgf.

Tear Strength Test of PVB Products

The components of Example 4-1 were used to prepare the modified PVB material in the form of pellets by the above preparation method (I), and then the modified PVB material was used to prepare modified PVB products in accordance with Preparation Example 2. In addition, the components of Examples 4-1 to 4-3 were used to prepare the modified PVB materials by the above preparation method (II), and then the modified PVB materials were used to prepare modified PVB products in accordance with Preparation Example 11-1, respectively. The above modified PVB products comprised two modified PVB layers and a fabric, in which a synthetic woven fabric (in 250D×250D 21T*19T) was used as the base layer (i.e., the fabric). The adhesive used was polyurethane glue.

Additionally, the tear strength test was carried out in accordance with the standard test GB/T16491. The modified PVB products were cut to give V-shaped specimens 8A to 8D having two "wings". The V-shaped specimens 8A to 8D as a whole had a length of 120 mm, a wing width (the width of any of the wings of V) of 30 mm, and an included angle between the two wings of 135°. Two square areas having a length of 20 mm and a width of 30 mm were attached to the end of wings respectively (the square length was included within the length of specimens as a whole) in order to be connected by the clamps for testing. When the longitudinal direction of the V-shaped specimens was the same with the longitudinal direction of the modified PVB product, they are marked as machine direction (MD). When the longitudinal direction of the V-shaped specimens was the same with the cross direction of the modified PVB products, they are marked as cross direction (CD).

The tear strength was tested by HD-A604S Testing Machine. During the test, the temperature was 23±2° C., the relative humidity was 60±5%, and the distance between the two clamps was 80 mm. The two ends of any of the V-shaped specimens 8A to 8D were connected to the upper and lower clamps respectively, and the center of the specimen under test was aligned with the median line between the two clamps. After that, the clamps were pulled outward at a testing speed of 200 mm/min. The test ended after the MD and CD specimen under test were broken, and the force value in kgf at breaking was recorded. Every group of specimens was tested for three times and the average is calculated. The results are shown in Table 6.

TABLE 6

| Specimen | 8A | | 8B | | 8C | | 8D | |
|---|---|---|---|---|---|---|---|---|
| Material | Example 4-1 | | Example 4-1 | | Example 4-2 | | Example 4-3 | |
| Method for preparing film | Pellet casting | | Direct calendering | | Direct calendering | | Direct calendering | |
| Preparation method | Preparation Example 2 | | Preparation Example 11-1 | | Preparation Example 11-1 | | Preparation Example 11-1 | |
| PVB layer thickness (mm) | F side 0.18 | R side 0.15 | F side 0.18 | R side 0.15 | F side 0.18 | R side 0.15 | F side 0.18 | R side 0.15 |
| Adhesive amount (g/m$^2$) | 15 | 10 | 15 | 10 | 15 | 10 | 15 | 10 |
| Tear strength in CD (kgf) | 12.5 to 13.5 | | 12.9 to 13.7 | | 14.3 to 15.6 | | 16.4 to 17.8 | |
| Tear strength in MD (kgf) | 18.5 to 19.6 | | 19.3 to 20.6 | | 21.2 to 22.8 | | 23.5 to 24.6 | |

From the above Table, it was clear that the PVB products prepared by casting (Preparation Example 2) or calendering (Preparation Example 11-1) had similar tear strength in CD and MD, so the modified PVB products prepared by the same modified PVB material of the present invention by casting or calendering had similar properties. In addition, the PVB products prepared by the material of Example 4-1 had lower tear strength in CD and MD than the PVB products prepared by the material of Example 4-2 or 4-3. Thus, when the PVB products with a higher tear strength is needed, TPU elastomer can be appropriately added in the preparation of PVB products. In addition, when the amount of TPU elastomer is higher than 18 parts by weight, the tear strength will be reduced (data not shown).

Flame Retardancy Test of PVB Products

The components of Examples 4-1, 5-1 and 5-2 were used to prepare the modified PVB materials by the above preparation method (II), and then the modified PVB materials were used to prepare modified PVB products in accordance with Preparation Example 11-1, respectively. The above modified PVB products comprised two modified PVB layers and a fabric, in which a synthetic woven fabric (in 250D× 250D, 21T*19T) was used as the base layer (i.e., the fabric). The adhesive used was polyurethane glue.

The modified PVB products were cut to give specimens 9A to 9C having a size of 140 mm×80 mm. When the longitudinal direction of the specimens was the same with the longitudinal direction of the PVB product, they are marked as machine direction (MD). When the longitudinal direction of the specimens was the same with the cross direction of the PVB product, they are marked as cross direction (CD). Each specimen was folded in half along the length and subjected to the flame retardancy test in automatic FFA VC-2 Vertical Flammability Tester. Every group of specimens was tested for three times and the average was calculated.

TABLE 7

| Specimen | 9A | | 9B | | 9C | |
|---|---|---|---|---|---|---|
| Material | Example 4-1 | | Example 5-1 | | Example 5-2 | |
| Flame retardant amount (PBW) | 0 | | 8 | | 15 | |
| Method for preparing film | Direct calendering | | Direct calendering | | Direct calendering | |
| Preparation method | Preparation Example 11-1 | | Preparation Example 11-1 | | Preparation Example 11-1 | |
| PVB layer | F side | R side | F side | R side | F side | R side |
| thickness (mm) | 0.18 | 0.15 | 0.18 | 0.15 | 0.18 | 0.15 |
| Adhesive amount (g/m$^2$) | 15 | 10 | 15 | 10 | 15 | 10 |
| Specimen direction | MD | CD | MD | CD | MD | CD |
| Average burning time (sec.) | Burned | Burned | 0.7 | 0.7 | 0.1 | 0.1 |
| Length of carbonization (inch) | Burned | Burned | 2.3 | 2.8 | 1.1 | 1.5 |

From Table 7, it was clear that the addition of 8 parts by weight (PBW) of flame retardant (zinc stannate and zinc hydroxystannate at a weight ratio of 1:1) resulted in good flame retardancy to the modified PVB material. Thus, when the PVB products with a higher flame retardancy is needed, zinc stannate and/or zinc hydroxystannate can be appropriately added in the preparation of PVB products.

In summary, the modified PVB material of the present invention has better water resistance, anti-sticking property and high temperature resistance. And the modified PVB products prepared by casting or calendering the modified PVB material can be used to produce outdoor products and daily necessities, such as dust covers, tents, raincoats, luggage, handbags, household goods, sporting goods, light box clothing, banners, floor mats and the like. In addition, other materials such as PVB and plasticizers can be added into the modified PVB material of the present invention to produce the laminating films for glass.

The above examples are used to illustrate the present invention, not intended to limit the claims of the present invention. The scope of the present invention is defined by the appended claims, not limited by embodiments described in the specification.

What is claimed is:

1. A modified polyvinyl butyral material, comprising a polyvinyl butyral composite material, a first filler, an anti-hydrolysis agent, zinc stearate, calcium stearate, a polymeric dispersant, a deodorant, tetramethylthiuram monosulfide, and trimethylolpropane tris(3-mercaptopropionate); wherein the polyvinyl butyral composite material is obtained by plasticizing a composition comprising polyvinyl butyral and a first plasticizer; wherein the first filler is in an amount of 3 parts by weight to 15 parts by weight, the anti-hydrolysis agent is in an amount of 0.3 parts by weight to 2.5 parts by weight, zinc stearate is in an amount of 1.5 parts by weight to 5 parts by weight, calcium stearate is in an amount of 0.1 parts by weight to 1.5 parts by weight, the polymeric dispersant is in an amount of 0.001 parts by weight to 0.010 parts by weight, the deodorant is in an amount of 0.8 parts by weight to 2.5 parts by weight, the tetramethylthiuram monosulfide is in an amount of 0.1 parts by weight to 0.2 parts by weight, and the trimethylolpropane tris(3-mercaptopropionate) is in an amount of 0.001 parts by weight to 0.005 parts by weight, based on 100 parts by weight of the total weight of the polyvinyl butyral composite material; and, in the polyvinyl butyral composite material, the first plasticizer is in an amount of 3 parts by weight to 15 parts by weight based on 100 parts by weight of the total weight of the polyvinyl butyral composite material.

2. The modified polyvinyl butyral material as claimed in claim 1, wherein the first filler comprises a crystalline aluminosilicate.

3. The modified polyvinyl butyral material as claimed in claim 1, wherein the anti-hydrolysis agent comprises carbodiimide, bis(2,6-diisopropylphenyl)carbodiimide, polycarbodiimides, or a combination thereof.

4. The modified polyvinyl butyral material as claimed in claim 1, wherein the polymeric dispersant comprises a polysiloxane, a high melting-point wax, or a combination thereof.

5. The modified polyvinyl butyral material as claimed in claim 1, wherein the deodorant comprises sodium bicarbonate, porous inorganic silicate, or a combination thereof.

6. The modified polyvinyl butyral material as claimed in claim 1, wherein the polyvinyl butyral composite material is a polyvinyl butyral leftover material.

7. The modified polyvinyl butyral material as claimed in claim 1, further comprising a second plasticizer in an amount of 2.5 parts by weight to 20 parts by weight based on 100 parts by weight of the total weight of the polyvinyl butyral composite material, wherein the second plasticizer is triethylene glycol bis(2-ethylhexanoate), di(2-propylheptyl) phthalate, or a combination thereof.

8. The modified polyvinyl butyral material as claimed in claim 1, further comprising polyvinyl alcohol in an amount of higher than 0 part by weight to 40 parts by weight, based on 100 parts by weight of the total weight of the polyvinyl butyral composite material.

9. The modified polyvinyl butyral material as claimed in claim 1, further comprising a second filler in an amount of 5 parts by weight to 160 parts by weight, based on 100 parts by weight of the total weight of the polyvinyl butyral composite material.

10. The modified polyvinyl butyral material as claimed in claim 1, further comprising a cold-resistant agent in an amount of 1.5 parts by weight to 10 parts by weight based on 100 parts by weight of the total weight of the polyvinyl butyral composite material, wherein the cold-resistant agent comprises dioctyl adipate, diisononyl adipate, polyisobutylene, or a combination thereof.

11. The modified polyvinyl butyral material as claimed in claim 1, further comprising an anti-oxidant in an amount of 0.5 parts by weight to 2.5 parts by weight based on 100 parts by weight of the total weight of the polyvinyl butyral composite material, wherein the anti-oxidant comprises pentaerythritol tetrakis(3-(3,5-di-t-butyl-4-hydroxyphenyl) propionate), tris-(2,4-di-t-butylphenyl)phosphite, N,N'-bis(3,5-di-t-butyl-4-hydroxyphenylpropionyl)-hexamethylenediamine, or a combination thereof.

12. The modified polyvinyl butyral material as claimed in claim 1, further comprising an anti-ultraviolet agent in an amount of 0.1 parts by weight to 1.5 parts by weight based on 100 parts by weight of the total weight of the polyvinyl butyral composite material, wherein the anti-ultraviolet agent comprises octrizole, 2 hydroxy-4-n-octoxy-benzophenone, or a combination thereof.

13. The modified polyvinyl butyral material as claimed in claim 1, further comprising a coloring agent in an amount of 0.5 parts by weight to 35 parts by weight based on 100 parts by weight of the total weight of the polyvinyl butyral composite material, wherein the coloring agent comprises an inorganic coloring agent.

14. The modified polyvinyl butyral material as claimed in claim 1, further comprising a flame retardant in an amount of 1 part by weight to 15 parts by weight based on 100 parts by weight of the total weight of the polyvinyl butyral composite material, wherein the flame retardant comprises zinc stannate, zinc hydroxystannate, or a combination thereof.

15. The modified polyvinyl butyral material as claimed in claim 1, further comprising glass powder in an amount of 3 parts by weight to 15 parts by weight, based on 100 parts by weight of the total weight of the polyvinyl butyral composite material.

16. The modified polyvinyl butyral material as claimed in claim 1, further comprising a foaming agent in an amount of 2 parts by weight to 10 parts by weight based on 100 parts by weight of the total weight of the polyvinyl butyral composite material; wherein the foaming agent is azodicarbonamide.

17. The modified polyvinyl butyral material as claimed in claim 1, further comprising a thermoplastic polyurethane elastomer in an amount of 5 parts by weight to 15 parts by weight, based on 100 parts by weight of the total weight of the polyvinyl butyral composite material.

18. A method for preparing the modified polyvinyl butyral material as claimed in claim 1, comprising the following steps:
(S1) mixing and compounding components including the polyvinyl butyral composite material, the first filler, the anti-hydrolysis agent, zinc stearate, calcium stearate, the polymeric dispersant, the deodorant, tetramethylthiuram monosulfide, and trimethylolpropane tris(3-mercaptopropionate) at 165° C. to 175° C. for 5 minutes to 10 minutes to obtain a crude modified polyvinyl butyral material; and
(S2) filtering the crude modified polyvinyl butyral material at 150° C. to 170° C. with a sieve of 140 meshes to 160 meshes to obtain the modified polyvinyl butyral material.

19. The method as claimed in claim 18, wherein the step (S2) is repeated at least twice.

20. The method as claimed in claim 18, further comprising the following step: (S3) cutting the modified polyvinyl butyral material into the modified polyvinyl butyral pellets by dies and cutter.

21. A modified polyvinyl butyral product, comprising a modified polyvinyl butyral layer prepared from a material comprising the modified polyvinyl butyral material as claimed in claim 1.

22. The modified polyvinyl butyral product as claimed in claim 21, further comprising a base layer set on the modified polyvinyl butyral layer, and the base layer is selected from the group consisting of a fabric layer, a metalized plastic layer, a plastic layer without any metal component, and combinations thereof.

23. The modified polyvinyl butyral product as claimed in claim 22, further comprising an adhesive layer between the modified polyvinyl butyral layer and the base layer.

24. The modified polyvinyl butyral product as claimed in claim 23, wherein each adhesive layer is independently composed of a mixture of a glue and a crosslinking agent, and the glue is selected from the group consisting of polyurethane glues, acrylic glues, and combinations thereof.

25. The modified polyvinyl butyral product as claimed in claim 21, wherein the modified polyvinyl butyral layer is foamed.

* * * * *